United States Patent
Gay et al.

(10) Patent No.: US 10,369,906 B2
(45) Date of Patent: Aug. 6, 2019

(54) CHILD SAFETY SEAT

(71) Applicant: Kioma, LLC, Dallas, TX (US)

(72) Inventors: Christopher Edward Gay, Dallas, TX (US); Christopher William Wischkowsky, Irving, TX (US); Chetan Raj, Irving, TX (US)

(73) Assignee: Kioma, LLC, Dallas, TX (US)

( * ) Notice: Subject to any disclaimer, the term of this patent is extended or adjusted under 35 U.S.C. 154(b) by 68 days.

(21) Appl. No.: 15/243,241

(22) Filed: Aug. 22, 2016

(65) Prior Publication Data

US 2018/0050614 A1    Feb. 22, 2018

(51) Int. Cl.
*B60N 2/26*    (2006.01)
*B60N 2/28*    (2006.01)

(52) U.S. Cl.
CPC ......... *B60N 2/2845* (2013.01); *B60N 2/2812* (2013.01); *B60N 2/2884* (2013.01)

(58) Field of Classification Search
CPC ...... B60N 2/28; B60N 2/2803; B60N 2/2806; B60N 2/2809; B60N 2/2812; B60N 2/2815; B60N 2/2818; B60N 2/2839; B60N 2/2842; B60N 2/2845; B60N 2/2884; A47D 13/10; A47D 13/102; A47C 3/029

See application file for complete search history.

(56) References Cited

U.S. PATENT DOCUMENTS

| | | | | |
|---|---|---|---|---|
| 2,291,640 A * | 8/1942 | Lee | ......... | A47D 1/06 297/130 |
| 3,659,865 A * | 5/1972 | Nothacker | ......... | B60N 2/2839 280/31 |
| 4,258,952 A * | 3/1981 | Dutra | ......... | A47C 3/029 248/364 |
| 4,591,208 A * | 5/1986 | McDonald | ......... | B60N 2/2806 297/216.11 |
| 4,679,854 A * | 7/1987 | Putsch | ......... | B60N 2/00 297/486 |
| 4,880,277 A * | 11/1989 | Takahashi | ......... | B60N 2/2812 297/467 |
| 4,986,599 A * | 1/1991 | Wise | ......... | A47D 1/002 297/183.3 |
| D321,992 S | 12/1991 | Butler | | |
| 5,161,855 A | 11/1992 | Harmon | | |
| 5,595,393 A * | 1/1997 | Batten | ......... | B60N 2/2845 280/30 |

(Continued)

FOREIGN PATENT DOCUMENTS

WO   WO-2017085719 A1 *   5/2017   ............... B60N 2/28

OTHER PUBLICATIONS

ISA/U.S., "International Search Report and Written Opinion for PCT/US2017/047981", dated Nov. 13, 2017.

(Continued)

*Primary Examiner* — Kyle J. Walraed-Sullivan
(74) *Attorney, Agent, or Firm* — David G. Woodral; GableGotwals

(57) ABSTRACT

A car seat includes a chassis formed as an interrupted shell defining a protected interior with a top opening, and a handle fixed to the chassis at a single point and covering a sufficient portion of a length of the top opening such that the handle functions as a carry handle and a roll bar against impacts or intrusions into the protected interior.

8 Claims, 19 Drawing Sheets

(56) References Cited

U.S. PATENT DOCUMENTS

| | | | | |
|---|---|---|---|---|
| 5,673,969 A * | 10/1997 | Frazier | B60N 2/2806 | 297/256.15 |
| 5,839,793 A * | 11/1998 | Merrick | A44B 11/006 | 297/484 |
| 5,845,967 A * | 12/1998 | Kane | B60N 2/2806 | 297/250.1 |
| D461,320 S | 8/2002 | Sher | | |
| 6,450,576 B1 * | 9/2002 | Rhein | B60N 2/2806 | 297/250.1 |
| D513,894 S | 1/2006 | Juraschek | | |
| 7,106,207 B1 * | 9/2006 | Marchan | B60N 2/002 | 340/438 |
| D534,732 S | 1/2007 | Chen | | |
| D569,308 S * | 5/2008 | Bergeron | D12/7 | |
| 7,677,661 B1 * | 3/2010 | Ferrari-Cicero | B60N 2/2812 | 297/219.12 |
| D619,045 S * | 7/2010 | Fujita | D12/1 | |
| D629,219 S | 12/2010 | Xu et al. | | |
| D652,642 S | 1/2012 | Etienne | | |
| D656,751 S * | 4/2012 | Levorato | D6/356 | |
| D657,579 S | 4/2012 | Klein | | |
| D721,897 S * | 2/2015 | Ritzel | D6/356 | |
| 9,150,126 B1 * | 10/2015 | Kitchens | B60N 2/2806 | |
| 9,669,739 B1 * | 6/2017 | Rajasingham | B60N 2/2884 | |
| 9,694,741 B2 * | 7/2017 | Salter | B60N 2/62 | |
| 9,713,968 B1 * | 7/2017 | Richardson | B60R 22/105 | |
| D804,205 S * | 12/2017 | Godard | D6/356 | |
| D806,441 S * | 1/2018 | Pan | D6/601 | |
| D808,181 S * | 1/2018 | Gay | D6/333 | |
| 2001/0048236 A1 * | 12/2001 | Baloga | B60N 2/2812 | 297/250.1 |
| 2002/0043837 A1 * | 4/2002 | Kain | B60N 2/2812 | 297/250.1 |
| 2002/0050728 A1 * | 5/2002 | Brown | A47D 13/102 | 297/130 |
| 2002/0135145 A1 * | 9/2002 | Saccani | B62B 3/14 | 280/33.991 |
| 2002/0145318 A1 * | 10/2002 | Asbach | B60N 2/2812 | 297/250.1 |
| 2003/0151286 A1 * | 8/2003 | Kain | B60N 2/2806 | 297/256.16 |
| 2003/0164627 A1 * | 9/2003 | Sedlack | A47D 13/02 | 297/183.1 |
| 2004/0155512 A1 * | 8/2004 | Nakamura | B29C 44/12 | 297/452.26 |
| 2005/0099046 A1 * | 5/2005 | Barth | B60N 2/2806 | 297/250.1 |
| 2005/0110318 A1 | 5/2005 | Meeker et al. | | |
| 2005/0189797 A1 * | 9/2005 | Robertson | B60N 2/2821 | 297/183.3 |
| 2006/0001300 A1 * | 1/2006 | Harcourt | B60N 2/2812 | 297/250.1 |
| 2006/0103229 A1 * | 5/2006 | Fransen | B60N 2/2812 | 297/484 |
| 2006/0108845 A1 * | 5/2006 | Balensiefer | B60N 2/2812 | 297/250.1 |
| 2007/0228788 A1 * | 10/2007 | Meeker | B60N 2/2806 | 297/250.1 |
| 2008/0073954 A1 * | 3/2008 | Paulson | B60N 2/28 | 297/219.12 |
| 2008/0201923 A1 * | 8/2008 | Barger | B60N 2/2812 | 24/69 ST |
| 2009/0085385 A1 * | 4/2009 | Harcourt | B60N 2/2812 | 297/256.15 |
| 2009/0167065 A1 * | 7/2009 | Kespohl | B60N 2/2845 | 297/183.4 |
| 2009/0200842 A1 * | 8/2009 | Goldberg | B08B 3/02 | 297/216.11 |
| 2010/0225150 A1 * | 9/2010 | Duncan | B60N 2/2806 | 297/256.12 |
| 2010/0298057 A1 * | 11/2010 | Lu | A47D 13/102 | 472/118 |
| 2011/0006572 A1 * | 1/2011 | Zhao | B60N 2/2812 | 297/256.15 |
| 2011/0012407 A1 * | 1/2011 | Bai | B60N 2/2812 | 297/256.15 |
| 2011/0018314 A1 * | 1/2011 | Isaacson | A47C 3/029 | 297/59 |
| 2011/0309663 A1 * | 12/2011 | Brunick | B60N 2/2812 | 297/250.1 |
| 2012/0032477 A1 * | 2/2012 | Cymbalski | B60N 2/28 | 297/135 |
| 2012/0235450 A1 * | 9/2012 | Oren | A47D 11/005 | 297/183.6 |
| 2012/0242129 A1 * | 9/2012 | Gaudreau, Jr. | B60N 2/2812 | 297/256.16 |
| 2012/0274105 A1 * | 11/2012 | Chen | A47D 1/08 | 297/183.1 |
| 2012/0292956 A1 * | 11/2012 | Gaudreau, Jr. | B60N 3/103 | 297/188.04 |
| 2013/0001939 A1 * | 1/2013 | Celia | B62B 9/005 | 280/756 |
| 2013/0076092 A1 * | 3/2013 | Kulkarni | B60N 2/643 | 297/301.1 |
| 2013/0082490 A1 * | 4/2013 | Tew | B60N 2/2845 | 297/183.6 |
| 2013/0175835 A1 * | 7/2013 | Fujita | B60N 2/265 | 297/219.12 |
| 2013/0285420 A1 * | 10/2013 | Buzaglo | B60N 2/265 | 297/118 |
| 2014/0008952 A1 * | 1/2014 | Spence | B60N 2/265 | 297/256.1 |
| 2014/0117729 A1 * | 5/2014 | Allen | B60N 2/4235 | 297/216.11 |
| 2014/0125099 A1 * | 5/2014 | Williams | B60N 2/2821 | 297/250.1 |
| 2014/0232152 A1 * | 8/2014 | Minato | B60N 2/2809 | 297/216.11 |
| 2015/0291064 A1 * | 10/2015 | Mitsuo | B60N 2/2812 | 297/256.15 |
| 2015/0291065 A1 * | 10/2015 | Renaudin | B60N 2/002 | 297/216.11 |
| 2015/0298647 A1 * | 10/2015 | Mitsuo | B60N 2/2812 | 297/256.15 |
| 2015/0329015 A1 * | 11/2015 | Forbes | B60N 2/265 | 297/183.6 |
| 2016/0059748 A1 * | 3/2016 | Cohen | B60N 2/2884 | 297/183.7 |
| 2016/0303344 A1 * | 10/2016 | Smudde | A61M 21/02 | |
| 2016/0347211 A1 * | 12/2016 | Dobson | B60N 2/2881 | |
| 2017/0065098 A1 * | 3/2017 | Taylor | A47D 13/025 | |
| 2017/0120781 A1 * | 5/2017 | Denbo | B60N 2/2812 | |
| 2017/0120791 A1 * | 5/2017 | Denbo | B60N 3/103 | |
| 2017/0182914 A1 * | 6/2017 | Lonstein | B60N 2/0232 | |
| 2017/0215600 A1 * | 8/2017 | Gunnigle | A47D 1/00 | |
| 2017/0251831 A1 * | 9/2017 | Perrin | A47D 15/00 | |
| 2018/0072197 A9 * | 3/2018 | Cohen | B60N 2/2884 | |

OTHER PUBLICATIONS

"The Baby C Cradle (If It's Hip It's Here)", Published Jun. 23, 2011, Available May 30, 2015, downloaded from https://web.archive/org/web/20150330230126; https://ifitshipitshere.blogspot.com/2011/06/baby-c-cradle-modern-walnut-wood-lined.

* cited by examiner

CHILD SAFETY SEAT

FIELD OF THE INVENTION

This invention relates in general to child restraint/safety devices and, more particularly, to a portable child restraint/safety device equipped with a roll-bar.

BACKGROUND OF THE INVENTION

Child safety seats, sometimes called child restraint systems (CRS), are legally required in many countries, including the United States, to more safely transport infants and young children inside vehicles. Conventional child restraint systems generally include multiple-pieces and tend to be heavy. Moreover, several preferred features may present structural weakness or weak points that can compromise a child's safety due to moving parts and other mechanisms that can introduce weakness/weak points to the CRS. In summary, the bulk and weight of existing CRS can impede their effective employment by parents; the moving parts of existing CRS are prone to failure and subsequent injury of the occupant; existing CRS provide little or no protection to the head and thoracic areas of the occupant in the event of a rolling or inversion accident; and, existing CRS have both ergonomic and aesthetic limitations that negatively affect use by parents.

Accordingly, there is a need to further develop a lighter, portable child seat that offers improved safety for the infant occupant, and improved ergonomics and utility for the parents.

SUMMARY OF THE INVENTION

The invention of the present disclosure, in one aspect thereof, comprises a chassis formed as an interrupted shell defining a protected interior with a top opening, and a handle affixed to the chassis and oriented above the top opening so as to act as a handle and a roll bar.

In some embodiments, the handle rigidly and imovably attaches to the chassis without moving parts. The chassis may be formed with a smooth interior surface.

The car seat may include a back plate rigidly fixed to the chassis in the protected interior and defining a plurality of openings for affixing a child safety harness to the back plate. The back plate may define a back and bottom and may be oriented within the chassis such that the back plate bottom forms a seat and the back plate back forms a seat back. The handle may be cantilevered over the back plate from a rear portion of the chassis proximate the seat back and may be concave from a bottom side to be stable on the arm of a person carrying the seat. The shell may have smooth outer convex side surfaces.

The chassis may have an upright stable configuration when placed on level ground and may also define a curvature on a lower portion thereof that can be used to rock the car seat.

The car seat may further comprise a five-point safety harness affixed to the back plate. The five-point safety harness may include a center connector, a pair of shoulder straps that pass from the connector through openings in the seat back, a pair of side straps that pass from the connector through laterally spaced openings in the seat bottom, and a center strap that passes from the connector through a central opening in the seat bottom. A quick adjustment strap may join the shoulder straps behind the seat back running under the seat bottom to a quick release connector affixed to the seat bottom. The quick release connector may comprise a spring clip affixed above a plane of the seat bottom. The spring clip may comprise a carbon fiber spring clip affixed to the seat bottom with an adhesive.

The invention of the present disclosure, in another aspect thereof, comprises a car seat including a chassis formed as a continuous, one piece, interrupted shell and defining a protected interior with space for a child, a top opening to the interior space, and side impact supports on opposite left and right sides of the top opening. The car seat also includes a handle rigidly and immovably fixed to the chassis at a single point and covering a sufficient portion of a length of the top opening such that the handle functions as a carry handle and a roll bar against impacts or intrusions into the protected interior.

In some embodiments, the handle proceeds over the top opening from a back of the protected interior. The car seat may include a back plate rigidly fixed to the chassis in the protected interior providing a seat back and seat bottom oriented toward the back and front, respectively, of the protected interior.

The back plate may define a plurality of openings for affixing a child safety harness. In such cases, the seat back may define a plurality of opening pairs defined at different elevations allowing adjustment of the five-point safety harness for varying child sizes. The pair of shoulder straps may join an adjustment strap behind the seat back. The adjustment strap may pass under and through the seat bottom to be accessible from a front upper portion of the seat bottom.

In some embodiments the shoulder straps and the side straps form continuous pieces. The functional delineation between side strap and shoulder strap may be defined at a sliding buckle that selectively attaches to a three way center connector. The side straps may pass through openings defined in the seat bottom and join together under the seat bottom. The center strap may selectively join the three way connector and passes through an opening defined in the seat bottom and may be retained by a rigid clamp below the seat bottom. The adjustment strap may be selectively retained by a toothed spring clip opening away from the seat back.

In some embodiments, the chassis defines a curved lower surface allowing the car seat to rock on level ground. The handle may define a loop over the top opening providing a plurality of carry handle surfaces. The handle may be concave on lower surface to provide a stable, no-hands carry position on the arm of a person carrying the car seat. The chassis may define left and right smooth outer curves projecting beyond any other surface or edge of the car seat.

The invention of the present disclosure, in another aspect thereof, comprises a car seat. The car seat has an outer chassis defining left, right, front, and back portions, a protected interior space, and a top opening. An integral, non-adjustable handle proceeds upwardly and forwardly from the back portion of the outer chassis to cover the top opening while leaving sufficient access to place a child into, and remove a child from, the protected interior space. A back plate is rigidly affixed to the outer chassis in the protected interior space and provides a seat back oriented toward the back of the chassis and a seat bottom oriented toward the front of the chassis. The car seat has a five-point safety harness including a pair of shoulder straps continuous with a pair of side straps, each single shoulder and side strap joined with a portion of a three way connector, the shoulder straps passing from a front to a back of the seat back and the side straps passing from above to below the seat bottom where they join together, the five-point safety harness also including a center strap joined with a portion of the three way connector and passing from above to below the seat bottom where the center strap is retained by a rigid clamp. The seat includes a carbon fiber spring clip adjustment mechanism fixed with respect to the seat and selectively engaged and adjustable with an adjustment strap passing under the seat bottom to join the pair of shoulder straps. The seat back defines a plurality of pairs of openings at different heights to allow the shoulder straps to be adjusted for children of different sizes.

In some embodiments, the chassis further defines smooth left and right outermost surfaces, upper and lower pairs of side impact supports, and a curved bottom surface allowing the car seat to rock on a flat surface.

BRIEF DESCRIPTION OF THE DRAWINGS

The present disclosure can be better understood by referring to the following figures in order to illustrate the principles of the disclosure. The figures are schematic and are not necessarily drawn to scale. Within the figures, like reference numerals denote like parts providing like functionality.

DETAILED DESCRIPTION OF THE PREFERRED EMBODIMENTS

The present disclosure is here described in detail with reference to particular embodiments. Other embodiments may be used and/or other changes may be made without departing from the spirit or scope of the present disclosure. The illustrative embodiments described in the detailed description are not meant to be limiting of the subject matter presented here.

Figure 1:
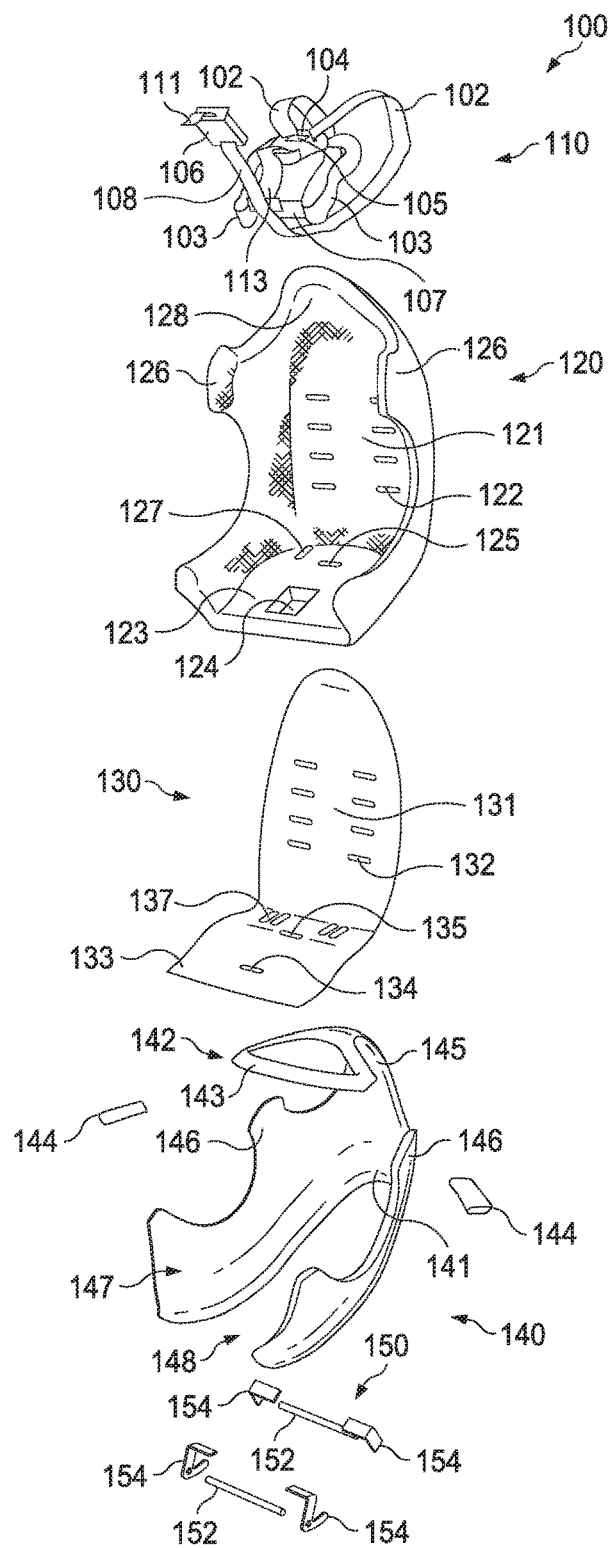
FIG. 1 is an exploded isometric view of a child safety seat according to aspects of the present disclosure.

Referring now to FIG. 1, an exploded view of a child safety seat 100, according to aspects of the present disclosure is shown. The child safety seat 100 may include a harness system 110, interior padding 120, back plate 130, chassis 140, and/or mounting assembly 150.

The harness system 110 may comprise a five-point safety harness to be fitted to a child. The harness system 110 may include all or part of shoulder straps or safety belt straps 102, side straps 103, center release button 105, quick release clamp 106, harness connector 107, quick release strap 108, quick release strap free-end 111, and center strap 113.

Interior padding 120 may comprise interior padding back 121, interior padding bottom 123, and padding side-impact supports 126. The interior padding back 121 may further include padding strap slots 122, side strap slots 127, and interior padding top head support 128. The interior padding bottom 123 may further include quick release strap passage 124, and center strap slot 125.

The back plate 130 may further include back plate back 131, and back plate bottom 133. The back 131 and bottom 133 may be generally planar individually and joined together at a bend thereby forming a seat structure such that a child's back is oriented toward the back 131 while the buttocks and legs are along the bottom 133. The back plate back 131 may further include back plate strap slots 132 and side strap slots 137. The back plate bottom 133 may further include quick release strap passage 134 and center strap slot 135.

The chassis 140 directly or indirectly integrates the other components of the car child safety seat 100. The chassis 140 may be formed as an interrupted shell 147 defining a protected interior portion 148 (e.g., a shell 147 with portions of the exterior defining openings to the interior 148). In some embodiments, the shell 147 is continuous in that it does not have any surface joints, seams, or discontinuities (apart from the openings defined to allow access to the interior 148). In some embodiments, the chassis 140 has no moving parts. Benefits of lack of moving parts are numerous. Non-limiting examples would include ease of use (both in installation and placing and removing a child), quietness, and decreased possibility of disturbing a child by needing to adjust or reconfigure the chassis 140. The chassis 140 may include a chassis back 141, chassis handle assembly 142, chassis side-impact supports 146, and mounting assembly 150. The chassis handle assembly 142 may further include a chassis handle grip 143, chassis handle grip covers 144, and chassis handle 145. The mounting assembly 150 may further include mounting rods 152, and secondary seat belt brackets 154.

Figure 4:
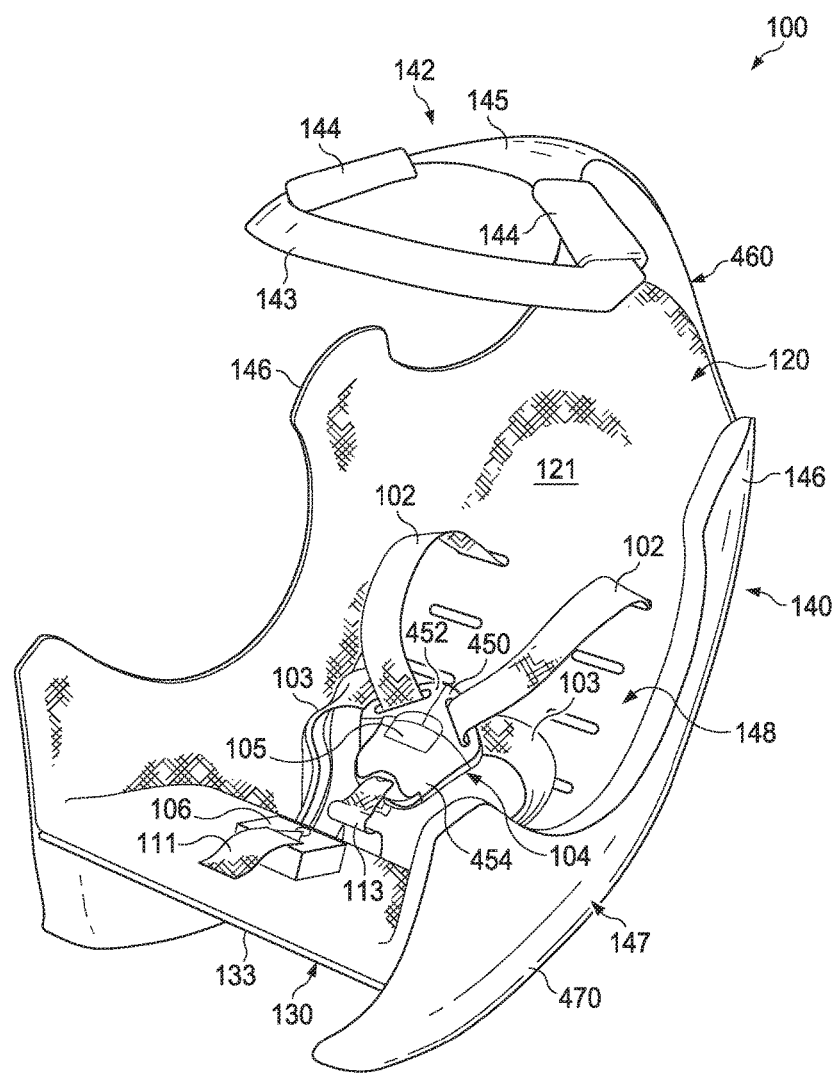
FIG. 4 is an isometric view of the child safety seat of FIG. 1.

Referring now also to FIG. 4 an isometric view of the child safety seat of FIG. 1 is shown. In some embodiments, safety belt straps 102 and side straps 103 join on each respective side of the child safety seat 102 at a left side sliding buckle 450 and right side sliding buckle 452. The sliding buckles 450, 452 demarcate the functional end boundary between the safety belt straps 102 and the side straps 103. In some embodiments, the safety belt straps 102 and the side straps 103 are formed from a continuous piece of webbing. The two side straps 103 may be joined below the interior padding 120 or formed from the same continuous webbing piece as the safety straps 102. As can be better seen from the inferior views discussed below (e.g., FIGS. 7-10), the side straps 103 may be anchored or affixed to the back plate bottom 133 via looping through the side strap slots 137.

On ends opposite the buckles 450, 452, the safety belt straps 102 may connect, directly or indirectly, to harness connector 107. Center strap 113 may include a first end affixed to a bottom buckle 454 and a second end that passes through center strap slot 125 of interior padding bottom 123 and center strap slot 135 of back plate bottom 133, and is coupled to an 5-clip (e.g., FIG. 10) located proximal to a back side of back plate bottom 133. Collectively, the left sliding buckle 450, the right sliding buckle 452, and the bottom buckle 454 comprise the center connector mechanism 104. The bottom buckle 454 may retain the release button 105 that allows the left sliding buckle 450, the right sliding buckle 452, and the bottom buckle 454 to be disconnected in response to applied pressure on the button 105.

In some embodiments, quick release strap 108 includes a first end that is coupled to harness connector 107, a middle portion that passes along back plate back 131 transiting interior padding bottom 123, and back plate bottom 133 via strap passage 124 and strap passage 134 and is in physical communication with quick release clamp 106, and quick release strap free-end 111 that exits quick release clamp 106 for adjusting (e.g., tighten, loosen, etc.) harness system 110 based on a child's age/size. In these embodiments, quick release clamp 106 can be implemented as any suitable fastening device that is configured to adjust (e.g., tighten, loosen, etc.) quick release strap 108 and associated quick release strap free-end 111 for securing and releasing the child from child safety seat 100. In these embodiments, one or more of the remaining safety belt straps 102 and/or side straps 103 are configured to release from center connector 104 when release button 105 is activated (such as, for example when a specific amount of pressure is applied to release button 105).

In some embodiments, safety belt straps 102, side straps 103, quick release strap 108, and center strap 113 can be constructed of any suitable strong material substantially similar to materials used for the manufacturing of seat/safety belts employed within automobiles. Center connector 104, release button 105, quick release clamp 106, and harness connector 107 can be constructed from any suitable materials, such as, for example carbon fiber, aramid fibers, acrylonitrile butadiene styrene (ABS) plastic, fiber glass, aluminum, laminated wood, steel, composites, combinations thereof, and the like.

In some embodiments, interior padding back 121, interior padding bottom 123, and interior padding side-impact supports 126 together form interior padding 120. In these embodiments, interior padding 120 can be manufactured as a single piece, such as, for example using a molding process. In other embodiments, interior padding back 121, interior padding bottom 123, and interior padding side-impact supports 126 are manufactured separately and mechanically coupled together. In these embodiments, interior padding bottom 123 is implemented as a substantially rectangular plane having four edges (e.g., front, back, left, and right). Further to these embodiments, interior padding back 121 is implemented as a substantially rectangular plane having four edges (e.g., top, bottom, left, and right), a front surface, and a rear surface where the front surface is configured to receive the back of a child, such as, for example concavely. Further to these embodiments, interior padding back 121 includes interior padding top head support 128 that is coupled to the top edge of interior padding back 121. In some embodiments, interior padding back 121 is configured as a single plane that includes interior padding top head support 128. In other embodiments, interior padding top head support 128 is implemented as a separate element and configured to mechanically couple to the top edge of interior padding back 121. Interior padding top head support 128 is configured to provide support to the child's head. In these embodiments, interior padding top head support 128 includes a front and a rear surface where the front surface is configured to receive the back of a child's head, such as, for example concavely. Interior padding side-impact supports 126 may each be implemented as substantially rectangular planes also having four edges (e.g., top, bottom, front, and back) wherein a significant portion of the front edge of each interior padding side-impact supports 126 (e.g., below the head area) includes a curvilinear indentation so as to allow ease of access to the occupant of the child seat as well as protection of the occupant's head and upper-lower body (e.g., hips, legs, etc.).

Further to these embodiments, the back edge of interior padding bottom 123 may be configured to mechanically couple to the bottom edge of interior padding back 121, left and right side edges of interior padding bottom 123 may each be configured to mechanically couple to the associated bottom edge of interior padding side-impact supports 126, and the back edge of each interior padding side-impact supports 126 may be configured to mechanically couple to the associated side edges of interior padding back 121.

In some embodiments, interior padding back 121 includes a plurality of interior padding strap slots, and interior padding bottom 123 includes quick release strap passage 124, center strap slot 125, and side strap slots 127. In these embodiments, interior padding strap slots 122 may allow the passage of the safety belt straps, side strap slots 127 allow the passage of the side straps there through, and center strap slot 125 allows the passage of center strap 113, thereby allowing a child placed within child safety seat 100 to be secured by adjusting harness system 110 according to the child's age and/or size. Further to these embodiments, quick release strap passage 124 may be configured to receive the passage of quick release strap 108 as well as quick release strap free-end 111, and the associated quick release clamp, thereby allowing a child placed within the child seat to be secured within or released therefrom.

In an example and referring to FIG. 1, interior padding strap slots 122 allow the passage of safety belt straps 102 there through, side strap slots 127 allow the passage of side straps 103 there through, and center strap slot 125 allows the passage of center strap 113, allowing a child placed within child safety seat 100 to be secured by adjusting harness system 110 according to the child's age and/or size. Further to this example, quick release strap passage 124 allows the passage of quick release strap 108 and quick release strap free-end 111, thereby allowing a child placed within child safety seat 100 to be secured within and released therefrom.

In some embodiments, interior padding side-impact supports 126 of interior padding 120 provide additional security to a child placed within child safety seat 100, such as, for example to provide substantial impact absorption along the head and upper-lower torso. In other embodiments, interior padding 120 is implemented as a removable cushioning material able to absorb and diffuse energy associated with impacts, rollovers, drops, vehicle collisions, rotation against a vehicle seat, and the like events, such that a child within child safety seat 100 remains safe. In some embodiments, interior padding 120 is designed to provide protection along the body and limbs of a child placed within child safety seat 100. In this example, interior padding 120 is configured to be impermeable so as to allow greater ease when cleaning (e.g., when wiping and/or washing said padding). Further to these embodiments, the layer of foam within interior padding 120 is designed to fill in volumes within back plate 130 so as to allow child safety seat 100 to accommodate children within a desired age range, (e.g., from 0 months of age to about 24 months of age).

In some embodiments, interior padding 120 is designed as a structure able to withstand and support a child's body weight. The interior padding 120 may also be useful for absorbing or dissipating impact forces. Suitable materials may include polystyrene, urethane, vinyl, and expanded polyethylene foams. In some embodiments, interior padding 120 includes one or more foam pieces (e.g., bottom and back) to make said interior padding. In one example, a 0.5 inch polystyrene piece can be located within the back of interior padding back 121. Further to this example, a 0.5-inch urethane piece can be located on top of the polystyrene to cover the full interior space of interior padding back 121. In other embodiments, interior padding 120 includes one or more layers of foam able to absorb and/or diffuse energy. In an example, interior padding 120 is designed to include a first layer of flame retardant, high-density, polyurethane foam and a second layer of flame retardant, lower density, polyurethane foam. In another example, interior padding 120 includes a flame retardant fabric cover over a single-depth foam within said padding. In yet another example, interior padding 120 includes polystyrene and polyurethane, and/or along materials suitable to withstand rotation of the vehicle due to impacts, rollovers, drops, vehicle collisions, rotation against a vehicle seat, and the like events, providing protection to the child within child safety seat 100. In yet another embodiment, the interior padding 120 comprises one or more pieces of expanded polyethylene (EPE) foam. The EPE may be bonded with nylon fabric resulting in a water-resistant and wipe-able surface. The EPE foam and nylon combination is glued to the interior of the chassis 140 and/or back plate 130 including chassis handle 145 of chassis handle assembly 142. The interior padding 120 may be non-porous, hypoallergenic, and/or treated with an antimicrobial treatment.

In some embodiments, back plate back 131 and back plate bottom 133 together form back plate 130. In these embodiments, back plate 130 can be manufactured as a single piece. In other embodiments, back plate back 131 and back plate bottom 133 can be manufactured separately and mechanically coupled to form back plate 130. In these embodiments, back plate back 131 is implemented as a substantially rectangular plane having four edges (e.g., top, bottom, left, and right). In other embodiments, back plate back 131 is implemented to further include a top portion configured to provide support to interior padding top head support 128. In some embodiments, back plate bottom 133 is implemented as a substantially rectangular plane having four edges (e.g., front, back, left, and right). Further to these embodiments, the bottom edge of back plate back 131 is configured to mechanically couple to the back edge of back plate bottom 133, left and right side edges of back plate back 131 are each configured to mechanically couple to the associated edges of chassis 140 (discussed below), and the top edge of back plate back 131 is configured to mechanically couple to bottom edge of chassis back 141 (discussed below).

In some embodiments, back plate back 131 includes a plurality of back plate strap slots 132, and back plate bottom 133 includes quick release strap passage 134, center strap slot 135, as well as side strap slots 137. In these embodiments, back plate strap slots 132 allow the passage of the safety belt straps, side strap slots 137 allow the passage of the side straps there through, and center strap slot 135 allows the passage of center strap 113, thereby allowing a child placed within a child safety seat 100 to be secured by adjusting a harness system according to the child's age and/or size. Further to these embodiments, quick release strap passage 134 is configured to receive the passage of quick release strap 108.

Portable child restraint/safety devices according to the present disclosure are designed to absorb and diffuse energy associated with impacts, rollovers, drops, vehicle collisions, rotation against a vehicle seat, and the like. The chassis 140 is implemented as the primary structural component of the child safety seat 100 (and others discussed below). The child safety seat 100, using the chassis 140, can be used as a rocking baby seat and sleeping cradle in the vehicle and/or elsewhere it may be needed.

The handle assembly 142, to include the handle 145 and grip 143, functions as a roll bar mechanism that resists impacts associated with an adult/user falling onto the child safety seat 100. The handle assembly 142 provides additional protection during both front and rear impact collisions, among others.

In an example and referring to FIG. 1, back plate strap slots 132 allow the passage of safety belt straps 102 there through, side strap slots 137 allow the passage of side straps 103 there through, and center strap slot 135 allows the passage of center strap 113, allowing a child placed within child safety seat 100 to be secured by adjusting harness system 110 according to the child's age and/or size. Further to this example, quick release strap passage 134 allows the passage of quick release strap 108 and quick release strap free-end 111, thereby allowing a child placed within child safety seat 100 to be secured and released therefrom.

In some embodiments, back plate strap slots 132, quick release strap passage 134, center strap slot 135, and side strap slots 137 are implemented as attachment passages suitable for attaching a harness system to the CRS. In these embodiments, said slots, strap slots, and the strap passage are implemented as perforations within interior padding 120 and back plate 130 that allow back plate 130 to mechanically couple to one or more of harness system 110 and/or interior padding 120 so that a child may be secured within child safety seat 100. Further to these embodiments, back plate strap slots 132 and quick release strap passage 134 are configured to allow harness system 110 to be adjusted for the size and/or age of the child. In other embodiments, back plate 130 can include additional orifices and/or notches (not shown) (e.g., employed when mounting child safety seat 100 onto a vehicle, installing accessories, and the like). In these embodiments, said additional orifices and/or notches may be located on the sides, top, or bottom of the seat in accordance with a desired design.

In some embodiments, back plate 130 is implemented to employ quick release strap passages (124 and 134) and back plate strap slots (122 and 132) of harness system 110 and/or interior padding 120 to facilitate the formation of a CRS for coupling to chassis 140 to form child safety seat 100. In an example, interior padding 120 further includes one or more components, such as, for example a hook and fastener attachment mechanism (e.g., Velcro®), a magnetic attachment mechanism, a button mechanism, snaps, a latch mechanism, and the like, that couple to a corresponding component located on back plate 130. Further to these embodiments, the layer of foam within interior padding 120 is designed to fill in different volumes within back plate 130 so as to allow child safety seat 100 to accommodate children within a desired age range (e.g., from 0 months of age to about 24 months of age).

In some embodiments, back plate 130 is configured as a structure able to withstand and support a child's body weight. In other embodiments, back plate 130 in conjunction with chassis 140 are manufactured to include smooth, easy-to-clean, surfaces on the interior and/or exterior. The back plate 130 and/or chassis 140 may be configured to prevent the accumulation of food, and other detritus within child safety seat 100. The back plate 130 and/or chassis 140 can be manufactured from any suitable materials, such as, for example carbon fiber, aramid fibers, ABS plastic, foam-core carbon fiber, fiber glass, aluminum, laminated wood, composites, combinations thereof, and the like.

In some embodiments, chassis 140 is implemented as the primary structural component of child safety seat 100. In these embodiments, chassis 140 further includes features and mechanisms that allow said chassis to couple to back plate 130. Further to these embodiments, chassis 140 includes three edges (e.g., top, bottom, and front) configured to define chassis back 141 and chassis side-impact supports 146. In some embodiments, chassis 140 is configured as a single piece of material such that chassis back 141 is in physical communication with a left chassis side-impact support and a right chassis side-impact support such that chassis 140 can receive back plate 130 therein. Further to these embodiments, the top edges of chassis 140 (along the top edges of chassis side-impact supports 146) are configured to include curvatures (e.g., curvilinear edges) conducive to protecting the occupant of child safety seat 100 as well as provide lines of site into and out of child safety seat 100. In these embodiments, chassis side-impact supports 146 are a central component of chassis 140 and provide side protection to a child during impacts, rollovers, drops, vehicle collisions, rotation against a vehicle seat, and the like events. It can be appreciated that such features, possibly being integral to the shell 147, serve to define the protected interior 148 of chassis 140.

In some embodiments, chassis handle 145 of chassis handle assembly 142 includes a proximal end and a distal end where the proximal end is configured to mechanically couple to the top edge of chassis back 141, and the distal end is configured to allow a user to carry child safety seat 100. In such embodiments, the chassis handle 145 has a single connection point 460 with the chassis 140. It should be understood that the single attachment point 460 may comprise a continuous connection between the chassis 140 (or more properly, chassis back 141) and the chassis handle 145, particularly where the chassis handle 145 is an integral component with the rest of the chassis 140. Further to these embodiments, the proximal end of chassis handle 145 is wider than the distal end and exhibits an increased degree of curvature, thereby providing an increased structural stability and rigidity.

In some embodiments, the chassis handle 145, and possibly the whole handle assembly 142, cover the protected interior 148 in a cantilevered fashion. Attaching to the chassis 140 at the attachment point 460, the handle assembly 142 can provide protection against roll-overs, drops, and other intrusions into the protected interior, while leaving more direct fontal and left and right sides of the interior 148 open. The open areas also allow for ease of placing or removing a child into the child safety seat 100 and do not unduly restrict access to the child or view of the child once he or she is placed in the child safety seat 100. In some respects, the handle assembly 142 may be considered another part of the continuously curved shell 147 having interruptions defined to provide access to the interior 148.

In other embodiments, chassis handle 145 is implemented to protrude from one side of child safety seat 100. In another embodiment, chassis handle 145 includes a proximal end and a distal end where the proximal end is configured to mechanically couple to the front edge of chassis 140 along the front edges of chassis side-impact supports 146 thereby protruding from the front/bottom of child safety seat 100. In these embodiments, chassis handle 145 of chassis handle assembly 142 is configured as a single piece as part of the upper portion of chassis back 141 of chassis 140.

In some embodiments, chassis handle grip 143, chassis handle grip covers 144, and chassis handle 145 together form chassis handle assembly 142. In these embodiments, chassis handle assembly 142 may be configured as a single piece along the upper portion of chassis 140. In other embodiments, chassis handle assembly 142 is configured as a separate assembly that is mechanically coupled to the upper portion of chassis 140. In still another embodiment, chassis handle 145 is configured along the upper portion of chassis 140 with the remaining elements of chassis handle assembly 142 (i.e., chassis handle grip 143 and chassis handle grip covers 144) configured as a separate assembly for coupling to the upper portion of chassis handle 145.

In some embodiments, chassis handle 145 of chassis handle assembly 142 is designed so as to allow a user to retract and/or rotate chassis handle assembly 142 to various different positions. In such cases, a user is able to conveniently retract and/or rotate chassis handle 145 and chassis handle assembly 142 when transporting or placing child safety seat 100 into a vehicle such as a car, airplane, train, high-chair and/or stroller. Mechanisms that allow chassis handle 145 of chassis handle assembly 142 to retract/rotate include resistive-hinge mechanisms, telescoping mechanisms, mechanical slides/guides/bearings, malleable materials, or similar mechanisms (not shown) that would allow said handle to be locked in a desired fixed position. In other embodiments, chassis handle assembly 142 can be manufactured separately and mechanically coupled together to chassis 140. In these embodiments, chassis 140 is configured to include chassis handle assembly 142 as a roll bar mechanism able to absorb and/or diffuse energy associated with impacts, rollovers, drops, vehicle collisions, rotation against a vehicle seat, and the like events, such that a child within child safety seat 100 remains safe.

In some embodiments, chassis handle assembly 142 is designed to resist the impact associated with an adult/user falling onto said child seat, where a child has previously been put therein. In other embodiments, chassis handle assembly 142 is configured to allow a user to carry child safety seat 100. In still other embodiments, chassis handle assembly 142 is configured to provide structural strength during transport, and to absorb and/or diffuse energy associated with impacts, rollovers, drops, vehicle collisions, rotation against a vehicle seat, and the like events. Chassis handle assembly 142 can be constructed from any suitable materials, such as, for example carbon fiber, aramid fibers, ABS, steel, plastic, foam-core carbon fiber, fiber glass, aluminum, laminated wood, composites, combinations thereof, and the like. Further to these embodiments, chassis handle 145 is configured as a handle that includes a structural support element (not shown), such as, for example a support rod, a support rod configured as a wishbone (e.g., and contained within chassis back 141 and chassis side supports 146) for further providing support to chassis 140. In these embodiments, said structural support element can be integrated into chassis handle 145 and/or chassis handle assembly 142 during manufacturing.

In some embodiments, chassis handle 145 and chassis handle grip 143 of chassis handle assembly 142 are configured to function as a roll bar mechanism to allow a user to suspend and swing child safety seat 100 from a suitable support, and/or hold objects such as toys, infant accessory items, and the like. In some embodiments, chassis handle assembly 142 may provide additional protection during both front and rear impact collisions. In an example, child safety seat 100 is located rear-facing in a vehicle and chassis handle assembly 142 provides protection from the driver/passenger seat collapsing into the child, and from rear-rotation of the child safety seat 100 against the back plate of the vehicle seat to which it is anchored. In some embodiments, chassis handle assembly 142 can be constructed from any suitable materials, such as, for example carbon fiber, ABS, foam-core carbon fiber, steel, fiber glass, plastic, aluminum, laminated wood, composites, combinations thereof, and the like.

In some embodiments, chassis handle grip covers 144 are coupled to chassis handle grip 143, and are configured to allow a user to grasp chassis handle grip 143 with a desirable level of comfort. In these embodiments, handle grip covers 144 are attached to chassis handle grip 143 using any suitable method, such as, for example stitching, sewing, gluing, riveting, snapping, buttoning, heating and/or combinations of the above. In other embodiments, handle grip covers 144 are made from any suitable materials, such as, for example ABS plastic, PVC, wood, foam, leather, fabric, silicone, plastic enclosed gel and/or combinations of the above. In some embodiments, handle grip covers 144 include a cushioning material (e.g., foam, leather, silicone, plastic enclosed gel, wood, foam and combinations of the above) for the user's comfort.

Figure 19:
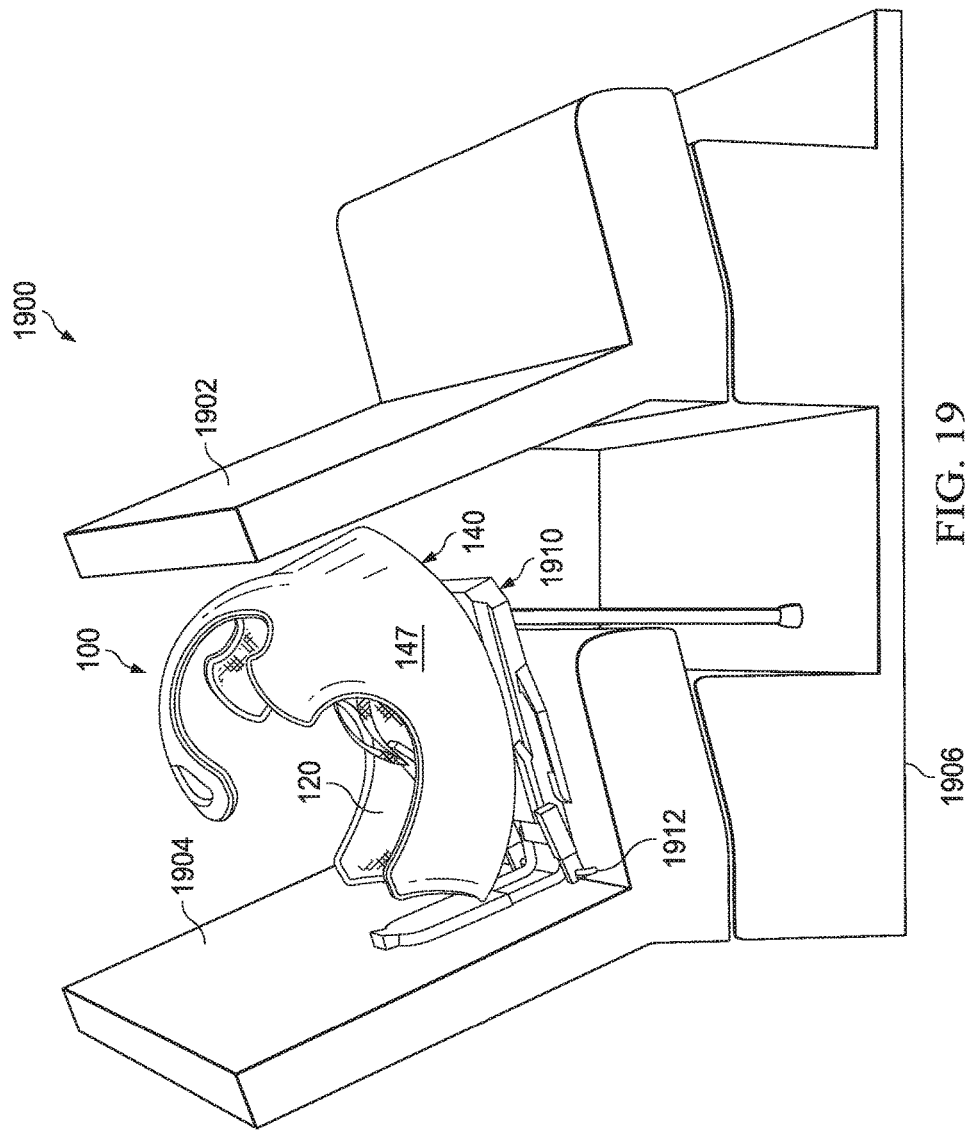
FIG. 19 is a perspective environmental view illustrating installation of a child safety seat according to aspects of the present disclosure with an ISOFIX base.
Figure 20:
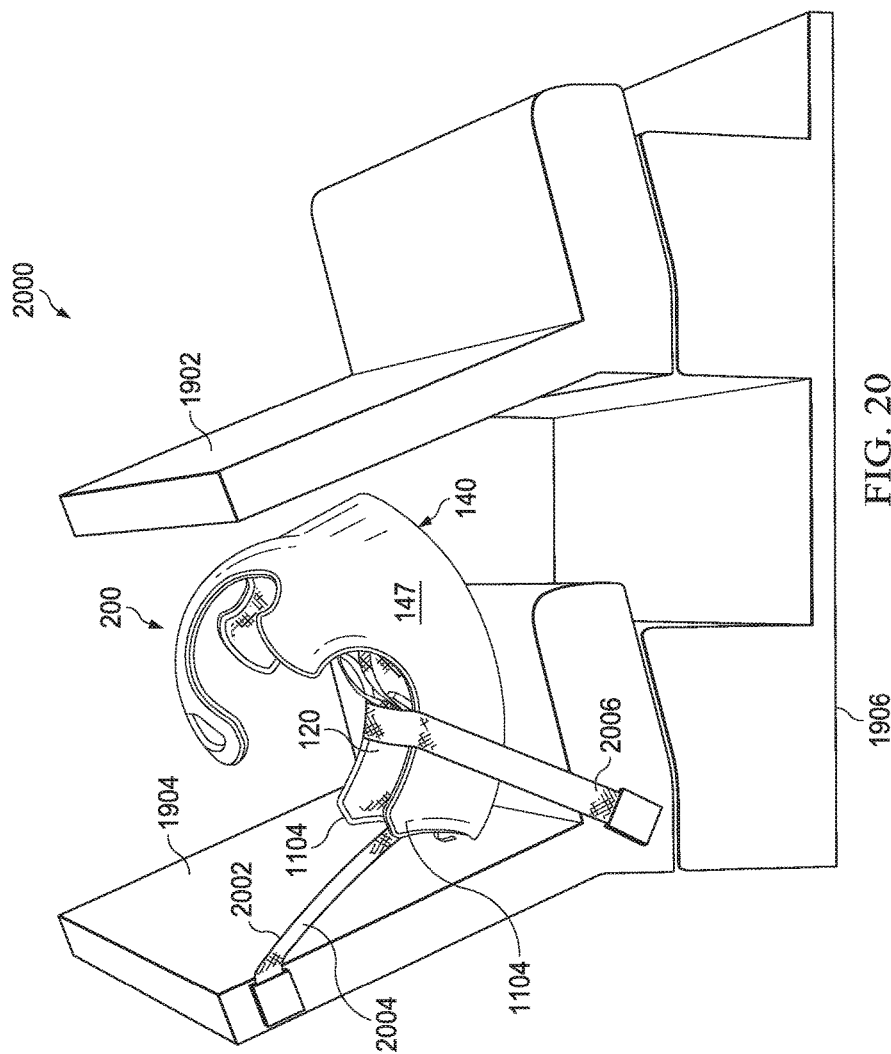
FIG. 20 is a perspective environmental view illustrating installation of a child safety seat according to aspects of the present disclosure without an ISOFIX base.
Figure 21:
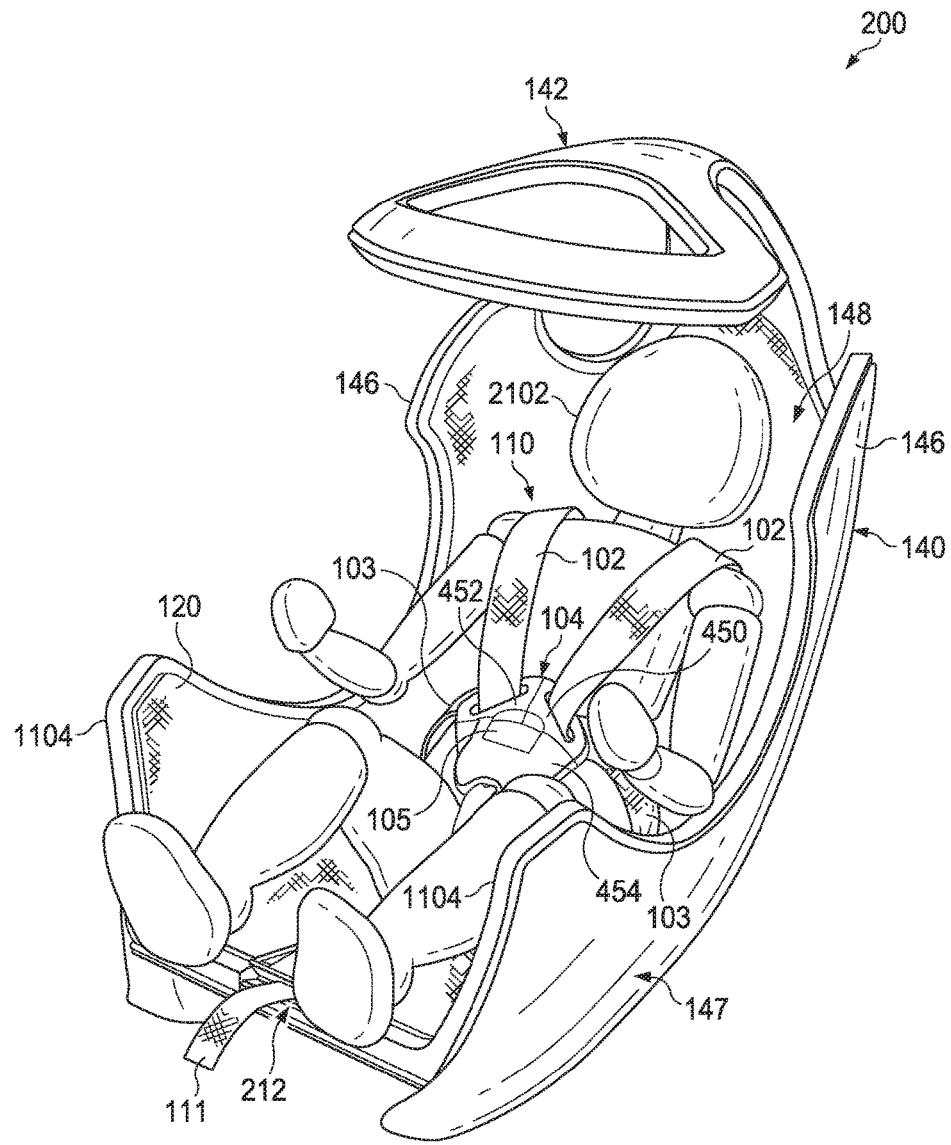
FIG. 21 is a perspective illustration of a child safety seat according to aspects of the present disclosure with a simulated infant secured therein.

In FIGS. 1 and 4, the interior padding 120 can be seen to end before reaching the handle assembly 142. However, in other embodiments (and as can be seen in FIGS. 19-21) the interior padding extends to cover all or a portion of the underside of the handle assembly 142. It should be understood that this more extensive version of the interior padding 120 might be used with any embodiment of the present disclosure. The interior padding 120 may also extend past the edge of the opening defined in the shell 147 (approximately ⅜ inch in some embodiments) for safety and/or aesthetics. A fabric cover (possibly a cotton blend, not shown) of equal of lesser footprint than the interior padding 120 may be used to provide a machine washable and/or replaceable layer atop the interior padding 120.

In some embodiments, chassis side-impact supports 146 can be manufactured from any suitable materials, such as, for example carbon fiber, ABS, foam-core carbon fiber, steel, fiber glass, plastic, aluminum, laminated wood, composites, combinations thereof, and the like.

In some embodiments, chassis 140 allows child safety seat 100 to be rocked due to its curvature design, thereby allowing a user to use said child seat as a rocking baby seat, and sleeping cradle in the vehicle and/or inside a home or elsewhere, as needed. Although the chassis 140 may be easily rocked due to the curved design of the lower portion, it retains an upright stable configuration. That is, it will return to a substantially upright position even when tilted to a substantial degree. The handle 145 being concave (from a bottom thereof) promotes hanging stability on a user's arm or hand potentially reducing the likelihood of a drop event. The generally smooth and inwardly curving features of the shell 147 also reduces the chance of an impact or snag when being moved or carried which could lead to a drop or overturn. The generally inwardly curving aspects of the shell 147 also promotes comfort for a user carrying the child safety seat 100 since it is less likely to impacts the legs. Further to this point, the shell 147 presents convex outer side surfaces 470 against which any accidental impact is likely to be taken (e.g., against the legs of one who is carrying the child safety seat 100). In other words, in some embodiments, a smooth curved surface is always the outermost point of possible contact along the sides of the shell 147.

In some embodiments chassis 140 is constructed from a material configured to provide a desired set of structural strength properties while remaining below a desired weight threshold. Suitable materials for use in manufacturing chassis 140 include carbon fiber, foam-core carbon fiber, aramid fibers, ABS plastic, fiber glass, aluminum, laminated wood, composites, combinations thereof, and the like. In an example, chassis 140 is constructed from a carbon fiber and a resin, having a high strength-to-weight ratio as well as necessary rigidity. In some embodiments, all of a portion of the chassis 140 may be constructed using a carbon fiber over a foam core. In other embodiments, chassis 140 includes additional, fewer, or differently arranged components than those elements illustrated in FIG. 1.

In some embodiments, mounting rods 152 and secondary seat belt brackets 154 together form mounting assembly 150. In these embodiments, mounting assembly 150 can be manufactured as a single piece. In other embodiments, the constituent elements of mounting assembly 150 can be manufactured separately and mechanically coupled together. In these embodiments, mounting assembly 150 is implemented as a component attached to chassis 140, and is configured to allow child safety seat 100 to be attached to a mounting system within a vehicle (not shown, e.g., an ISOFIX or LATCH base), such as a car, airplane, train, high-chair and/or stroller. In these embodiments, mounting rods 152 within mounting assembly 150 are configured as cylinders attached to chassis 140 and are used to secure child safety seat 100 into a mounting base (e.g., an ISOFIX or LATCH base). Further to these embodiments, mounting rods 152 of mounting assembly 150 are attached to chassis 140 via any suitable attachment mechanism, such as, for example an adhesive (e.g., epoxy or resin), screws, rivets, brackets, or a combination thereof. In an example, mounting rods 152 are configured so as to allow child safety seat 100 to be mounted to a commercially available ISOFIX base (or LATCH base) that is installed within a vehicle, such as, for example a car, airplane, train, high-chair and/or stroller. Further to this example, mounting rods 152 within mounting assembly 150 may additionally allow child safety seat 100 to be mounted on a desired accessory, such as, for example a mounting frame, rocking frame, stroller frame, and the like. In another example, secondary seat belt brackets 154 allow a lap belt to be passed through/over mounting rods 152, to secure the child safety seat to the car seat frame. In some embodiments, mounting rods 152 and secondary seat belt brackets 154 can be constructed from any suitable materials, such as, for example carbon fiber, aramid fibers, foam-core carbon fiber, ABS plastic, fiber glass, aluminum, laminated wood, steel, composites, combinations thereof, and the like.

Figure 2:
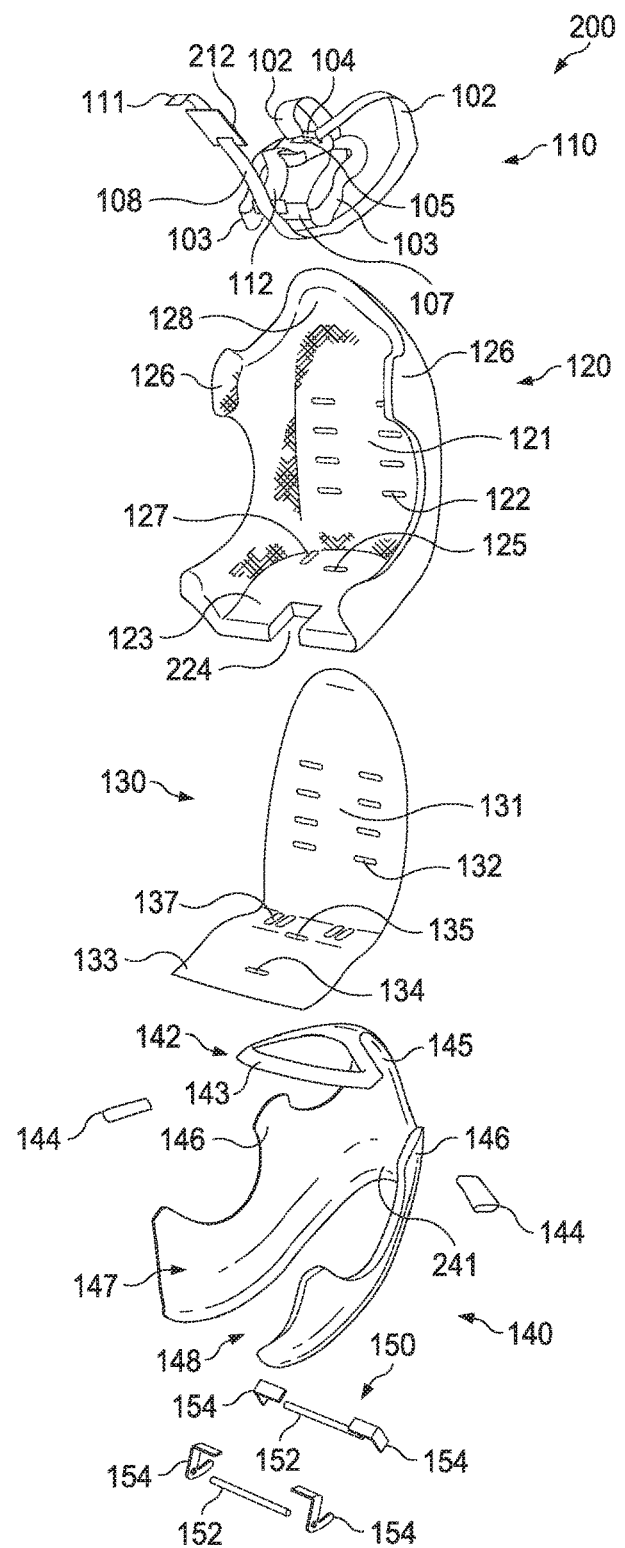
FIG. 2 is an exploded isometric view of a child safety seat with an alternative quick release clamp according to aspects of the present disclosure.

Referring now to FIG. 2 an exploded isometric view of a child safety seat 200 with an alternative quick release clamp 212 according to aspects of the present disclosure is shown. The child safety seat 200 is, in many ways, substantially similar to child safety seat 100 previously described. The child safety seat 200 includes the harness system 110, interior padding 120, back plate 130, chassis 140, and mounting assembly 150. Again, the harness system 110 further includes safety belt straps 102, side straps 103, center connector mechanism 104, release button 105, harness connector 107, quick release strap 108, quick release strap free-end 111, and center strap 113. The alternative quick release clamp 212 is described in detail greater detail below in conjunction with in FIG. 17 but may be understood at this point to replace and improve upon the functionality of the quick release clamp 106 as described above with respect to FIG. 1.

The interior padding 120 of the child safety seat 200 may further include interior padding back 121, interior padding bottom 123, and padding side-impact supports 126. Interior padding back 121 may further include padding strap slots 122, and interior padding top head support 128. The interior padding bottom 123 may further include quick release strap passage 224, center strap slot 125, and side strap slots 127. The back plate 130 may further include back plate back 131 and back plate bottom 133. The back plate back 131 may further include back plate strap slots 132, and back plate bottom 133 may further include quick release strap passage 134, center strap slot 135, and side strap slots 137.

It may be noted that the quick release strap passage 224 of child safety seat 200 may differ somewhat from that of quick release strap passage 124 (FIGS. 1-2) of child safety seat 100. In the case of child safety seat 100, the quick release strap passage 124 may be a square or rectilinear opening passing through the plane of the padding 120. However, owing to the arrangement of the alternate quick release mechanism 212, the quick release strap passage 224 may be an open ended passage, a recess, or an inlet into the plane of a seat portion of the interior padding 120. As described in greater detail below, the alternative quick release 212 passes the free end 111 of the quick release strap 108 essentially straight outwardly from the seat plane rather than upwardly, yet retains the free end 111 above the plane of the back plate bottom 133 for ease of access.

The chassis 140 is once again important to the performance of the child safety seat 200 and serves as the component around which the others are integrated into a finished product. Again the chassis 140 may further include chassis back 141, chassis handle assembly 142, chassis side-impact supports 146, and mounting assembly 150. The chassis handle assembly 142 may further include chassis handle grip 143, chassis handle grip covers 144, and chassis handle 145. The mounting assembly 150 may further includes mounting rods 152, and secondary seat belt brackets 154.

Figure 5:
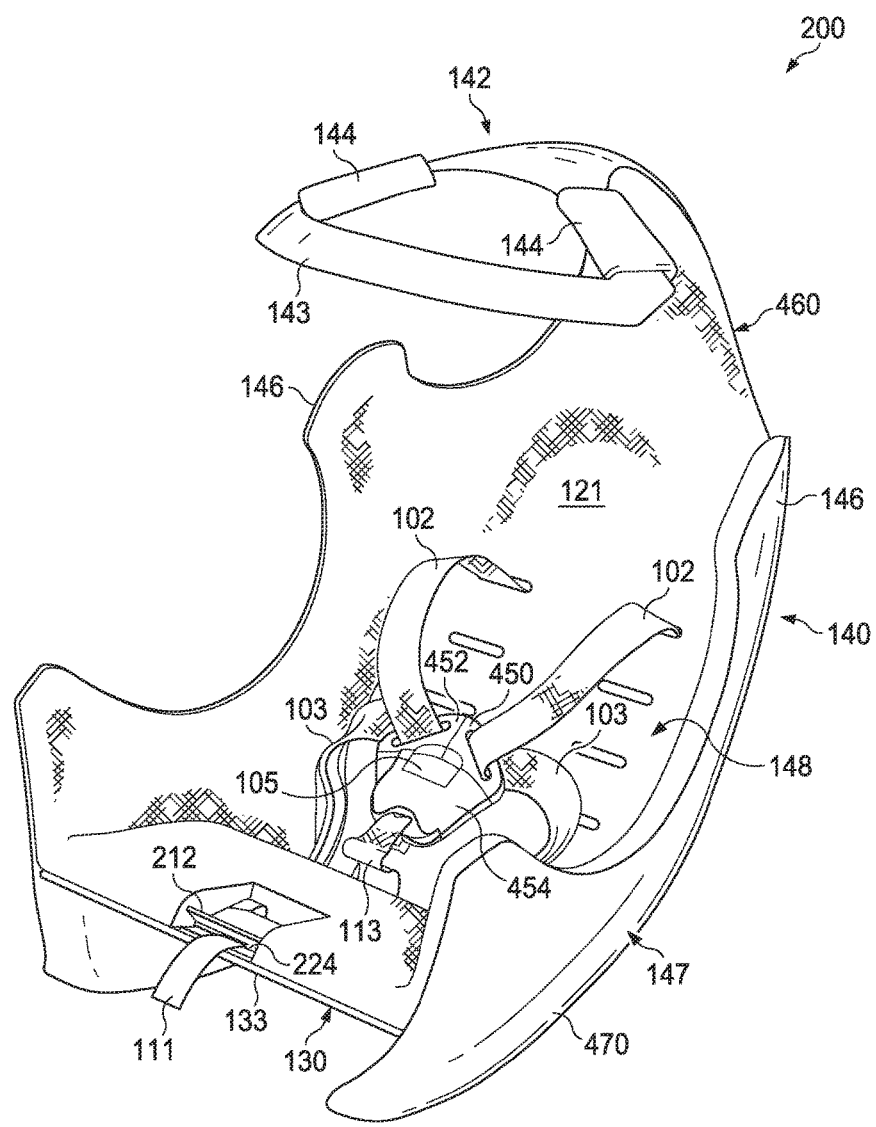
FIG. 5 is an isometric view of the child safety seat of FIG. 2.

With reference now also to FIG. 5 an isometric view of the child safety seat 200 of FIG. 2 is shown. Here, the configuration of the harness system 110, and the configuration and placement of the alternative quick release clamp 212 may be more easily appreciated. The quick release strap 108 may include a first end, a middle portion, and quick release strap free-end 111. In such embodiments, the first end of quick release strap 108 may be coupled to harness connector 107. The middle portion may pass along back plate bottom 133 transiting interior padding bottom 123 and back plate bottom 133 via strap passage 224 and strap passage 134 and is in physical communication with alternative quick release clamp 212. Quick release strap free-end 111 exits alternative quick release clamp 212 for adjusting (e.g., tighten, loosen, etc.) harness system 110 based on a child's age/size. In these embodiments, alternative quick release clamp 212 can be implemented as any suitable fastening device that is configured to adjust (e.g., tighten, loosen, etc.) quick release strap 108 and associated quick release strap free-end 111 for securing and releasing the child from child safety seat 200 (however, certain advantages may be realized in implementing the alternative quick release clamp 212 as discussed below and shown in FIG. 17).

In some embodiments, safety belt straps 102, side straps 103, and quick release strap 108 (via quick release clamp 212) are fastened in front of the child so that the child's shoulders and body fit firmly within the child seat. Center connector mechanism 104, release button 105, quick release clamp 212, and harness connector 107 can be constructed from any suitable materials, such as, for example carbon fiber, aramid fibers, ABS plastic, fiber glass, aluminum, laminated wood, composites, combinations thereof, and the like.

Figure 3:
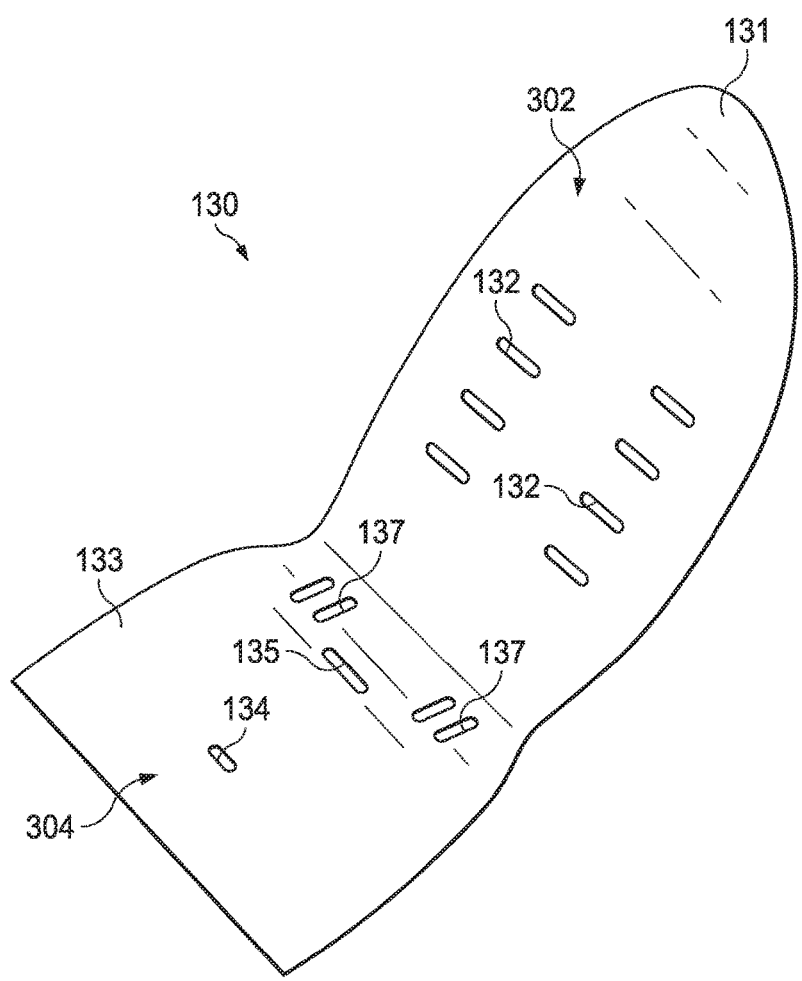
FIG. 3 is an isometric view of a back plate for use with a child safety seat according to aspects of the present disclosure.

Referring now to FIG. 3, is an isometric view of a back plate 130 for use with a child safety seat according to aspects of the present disclosure is shown. As described above, the back plate 130 includes generally the back plate back 131, back plate bottom 133, back plate strap slots 132, quick release strap passage 134, center strap slot 135, and side strap slots 137. The back plate back 131 forms a seat back 302 while the back plate bottom 133 forms a seat bottom 304 (it should be understood that the seating surfaces 302, 304 may be provided with padding or other coverings during in use, as described elsewhere herein).

FIG. 3 illustrates more clearly that back plate strap slots 132 comprise multiple pairs of laterally spaced apart horizontal slots to accommodate shoulder straps 102 (e.g., FIG. 1). Each pair of back plate strap slots 132 are at varying heights along the back plate back 131 to accommodate children of varying sizes. The side strap slots 137 may comprise two laterally spaced apart pairs of slots. The individual side strap slots 137 are oriented such that a wider dimension thereof is arranged front to back on the back plate bottom 133. The side straps 103 loop through the side strap slots 137 when the harness 110 is installed (see, e.g., FIGS. 7-10).

In FIG. 3, the back plate 130 is illustrated as an embodiment of a portion of a child safety seat (e.g., 100, 200) according to aspects of the present invention. In some embodiments, back plate back 131 includes a plurality of back plate strap slots 132 as well as side strap slots 137, and back plate bottom 133 includes quick release strap passage 134 as well as center strap slot 135. In these embodiments, back plate strap slots 132 allow the passage of the safety belt straps 102, side strap slots 137 allow the passage of the side straps 103 therethrough, and center strap slot 135 allows the passage of the center strap 113, thereby allowing a child placed within a child seat to be secured by adjusting the harness system 110 according to the child's age and/or size.

Further to these embodiments, quick release strap passage 134 is configured to receive the passage of the quick release strap 108 as well as the quick release strap free-end 111 and the associated quick release clamp 106 (or alternative quick release clamp 212), thereby allowing a child placed within the child seat to be secured and released therefrom.

Figure 6:
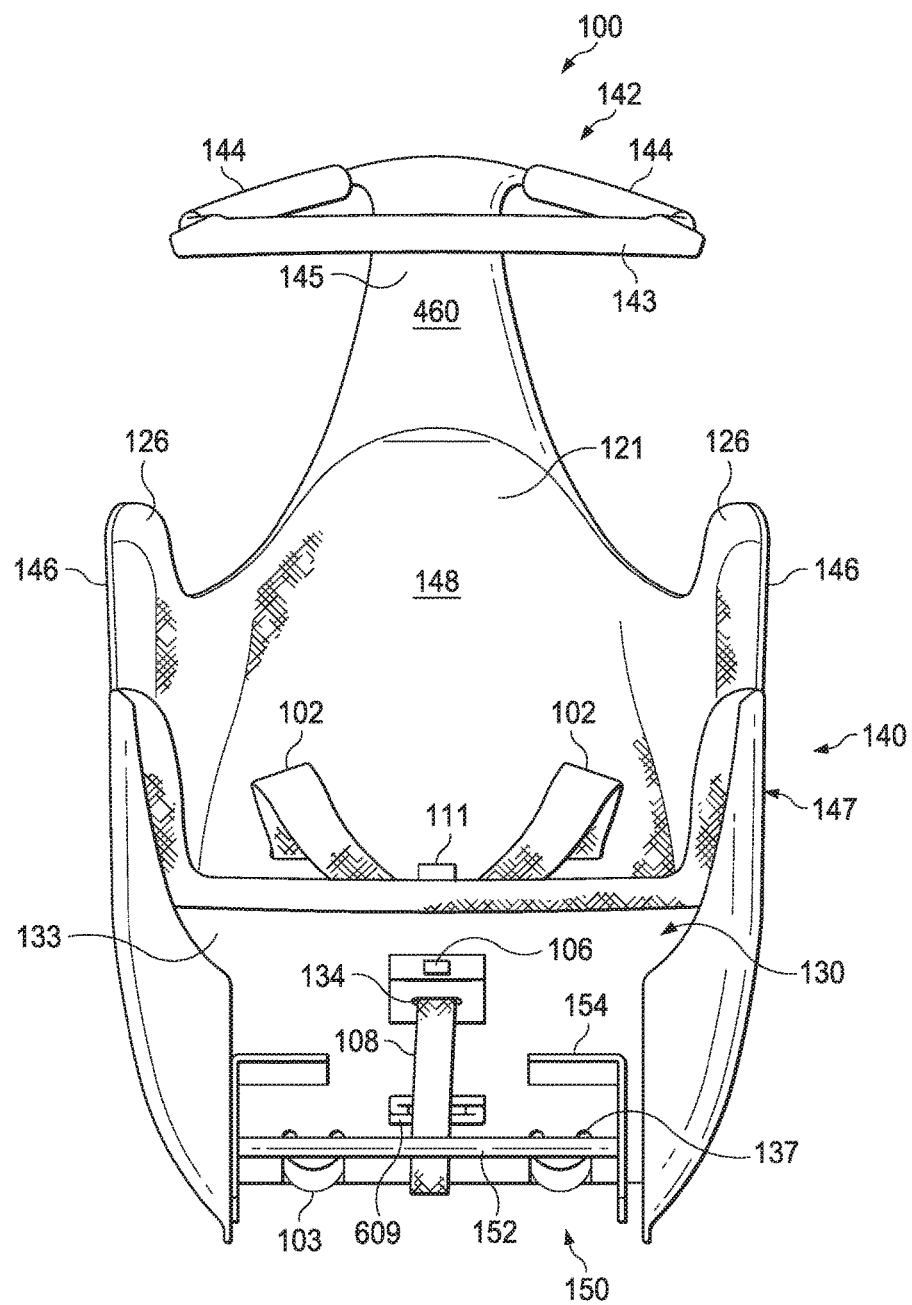
FIG. 6 is a bottom-front view of the child safety seat of FIG. 1.

Referring now to FIG. 6 is a bottom-front view of the child safety seat 100 of FIG. 1 is shown. Here the location of an S-clip 609, proximate the center strap slot 135 in the back plate bottom 133 can be observed. The center strap 113 is affixed to the S-clip and thus prevented from withdrawing through the center strap slot 135. Other embodiments may utilize devices other than S-clips to prevent the center strap 113 from being withdrawn through the center strap slot 135. The quick release strap 108 can also be observed to pass from behind the back plate back 131 and under the back plate bottom 133 to the quick release strap passage 134. Entering and passing through the quick release strap passage 134, the quick release strap may be selectively retained by the quick release clamp 106.

Figure 7:
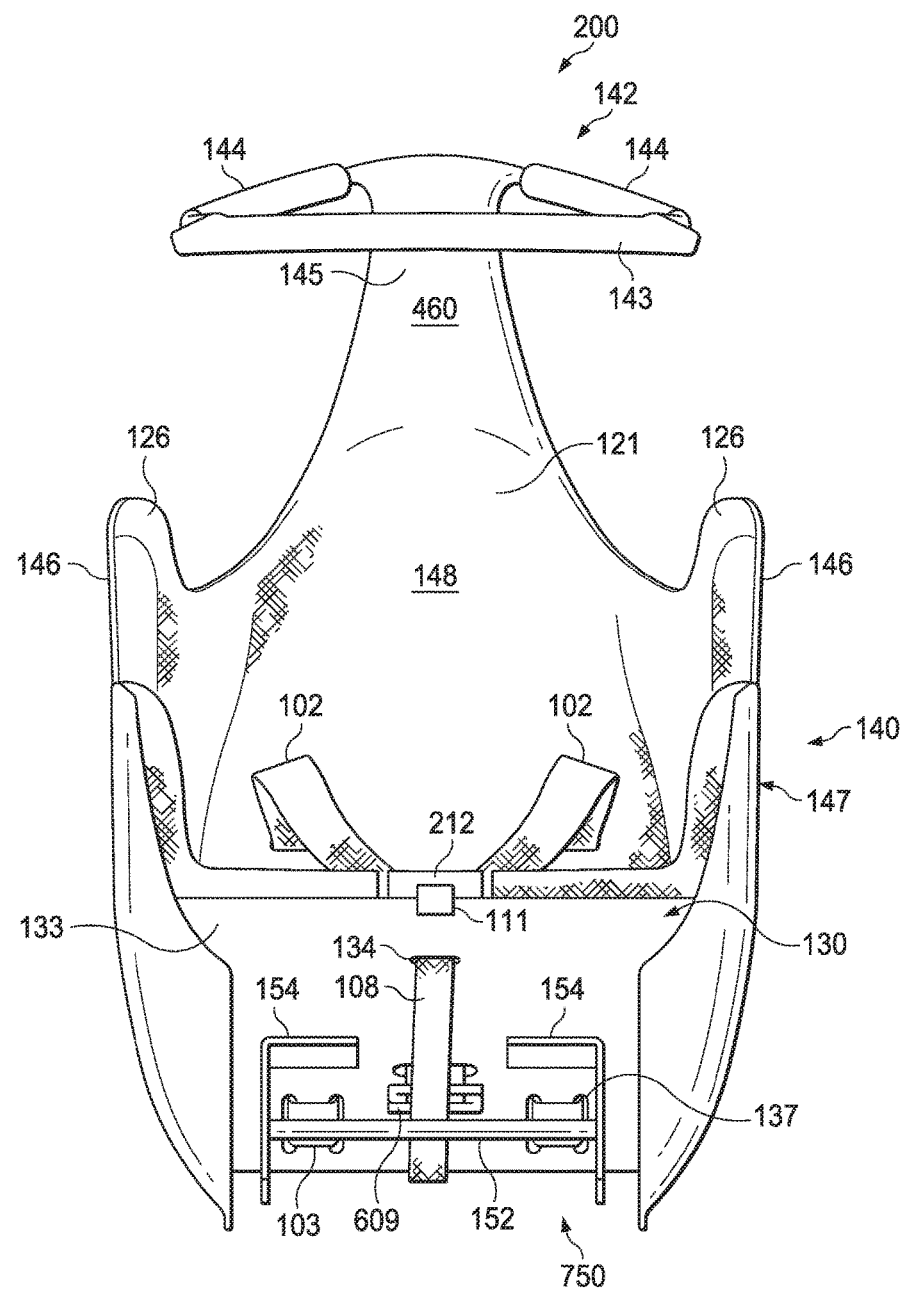
FIG. 7 is a bottom-front view of the child safety seat of FIG. 2.

Referring now to FIG. 7 is a bottom-front view of the child safety seat 200 of FIG. 2 is shown. As discussed above, child safety seat 200 is substantially similar to the child safety seat 100 but for the substitution of the alternative quick release clamp 212. The quick release strap 108 can, once again, be seen traversing from behind the back plate back 131 and under the back plate bottom 133 and into quick release strap passage 134. The quick release strap then passes into alternative quick release clamp 212 from which the free end 111 of the quick release strap 108 exits. As can be seen more easily in FIG. 5, the alternative quick release clamp 212 may be wholly or partially situated within the quick release strap passage 224, from which the free end 111 may also exit.

Figure 8:
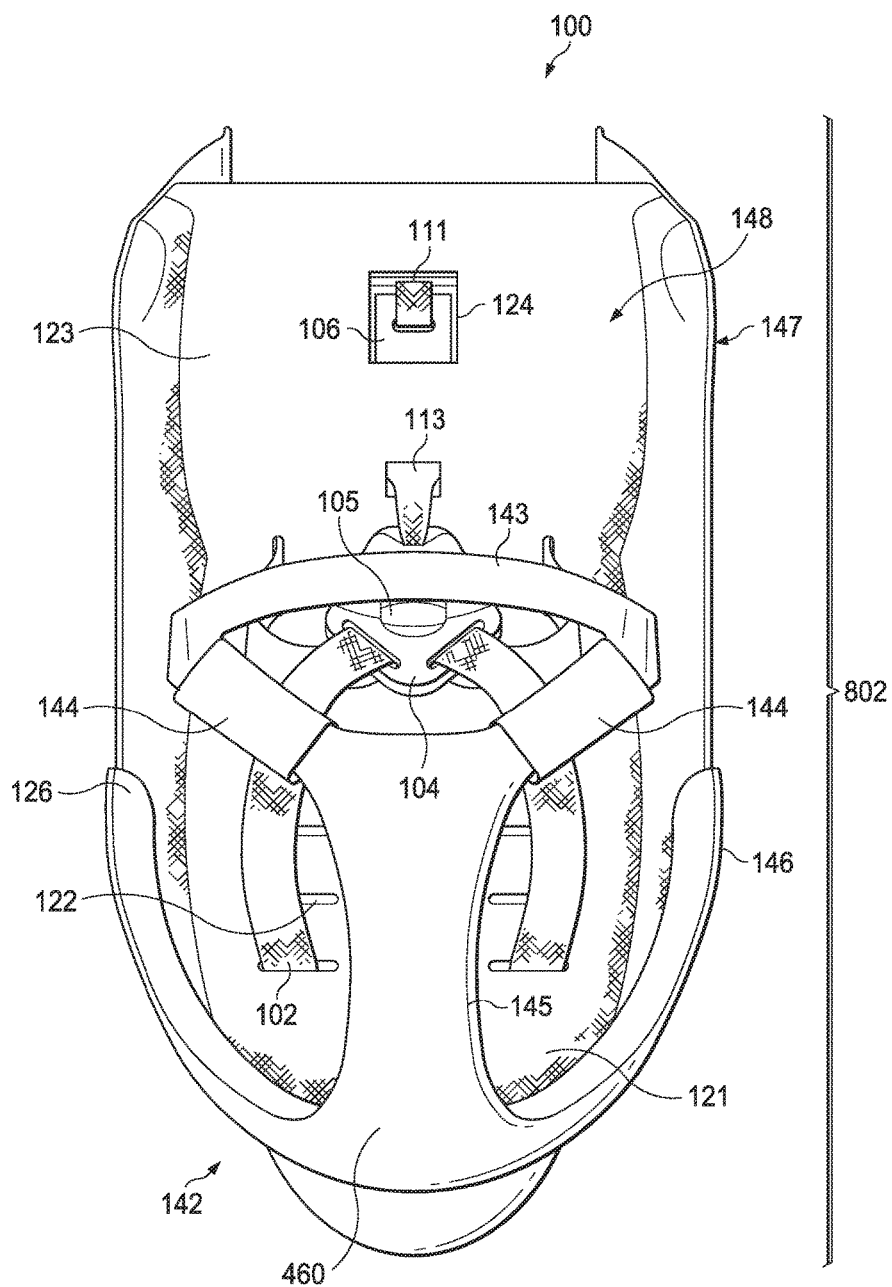
FIG. 8 is a top-down view of the child safety seat of FIG. 1.

Referring now to FIG. 8 is a top-down view of the child safety 100 seat of FIG. 1 is shown. Here the arrangement of the handle assembly 142 and its associated components can be seen to cover a substantial portion of what may be considered the top opening 802 of the child safety seat 100. The top opening 802 represents an interruption in the otherwise continuous surface of the shell 147 (formed by chassis 140). The chassis handle 145 and overall handle assembly 142 can be seen to be cantilevered over the top opening 802 from the attachment point 460 at what would be considered the rear of the child safety seat 100. The handle assembly 142 may cover substantially the entire area above the top opening 802 or may only cover the regions above the head and neck area, as shown. One or more gripping surfaces (e.g., grip 143) may be positioned more or less above the center of gravity of the seat 100 (considering inclusion of the child) in order to promote stability when carrying.

FIG. 8 also illustrates a superior view of the free end 111 of the quick release strap 108 exiting the quick release clamp 106 via quick release strap passage 124.

Figure 9:
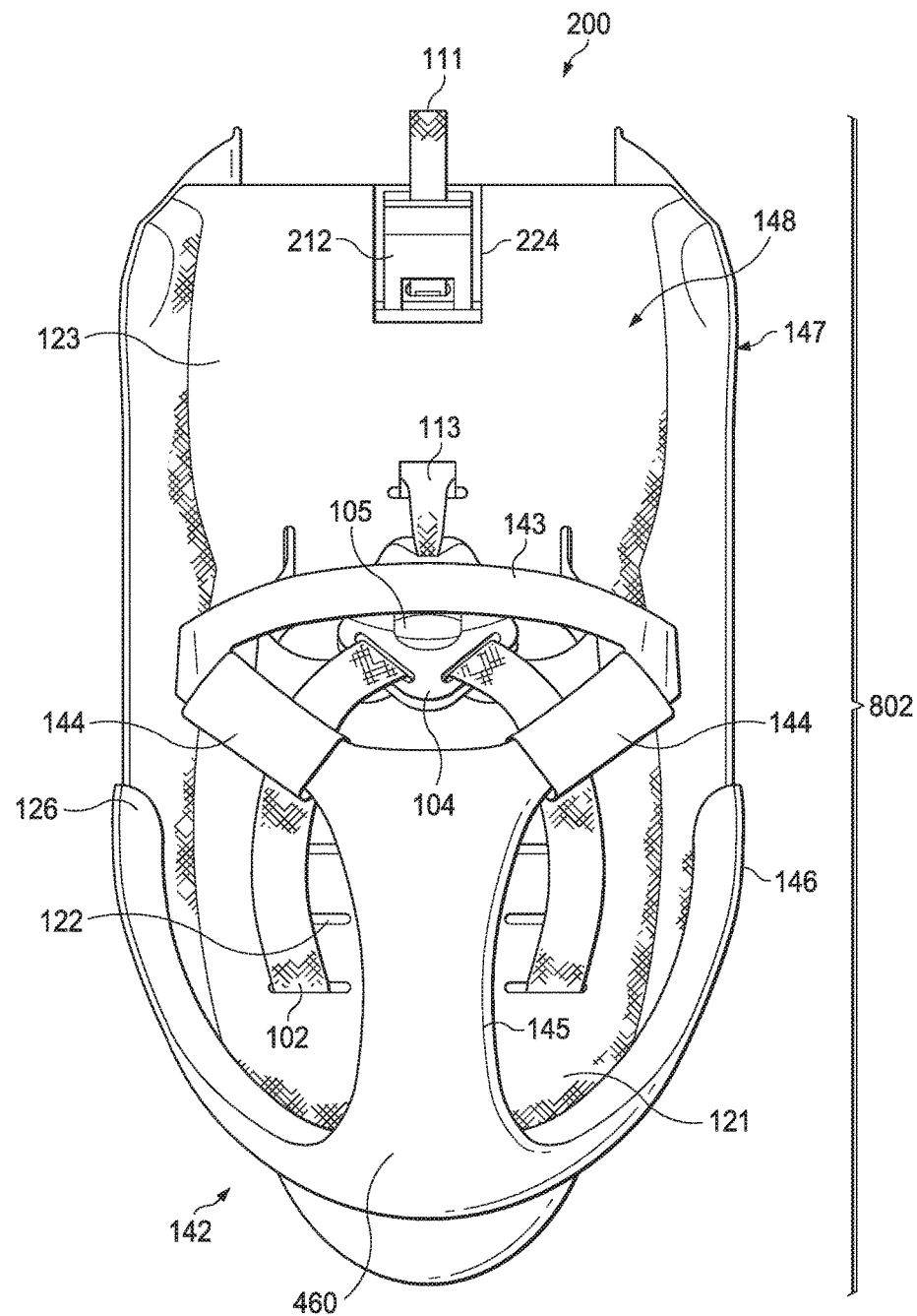
FIG. 9 is a top-down view of the child safety seat of FIG. 2.

Referring now to FIG. 9 is a top-down view of the child safety seat 200 of FIG. 2 is shown. Here again, it can be seen that the car seats 100 and 200 are substantially similar but for the substitution of the alternative quick release clamp 212 in the seat 200. Again, the child safety seat 200 provides a top opening 802 defined as an interruption in the shell 147 defining the protected interior 148. The handle assembly 142 may be cantilevered from the attachment point 460 over the opening 802. The handle assembly 142 may cover all or a portion of the area above the opening 802 as shown. Again, a grip 143 may be provided more or less over the center of gravity of the seat 200, including a child, in order to promote stability when carrying.

FIG. 9 also provides a superior view of the alternative quick release clamp 212 at least partially within the quick release strap passage 224 from which the free end 111 of quick release strap 108 can be seen to exit straight away from the seat back area.

Figure 10:
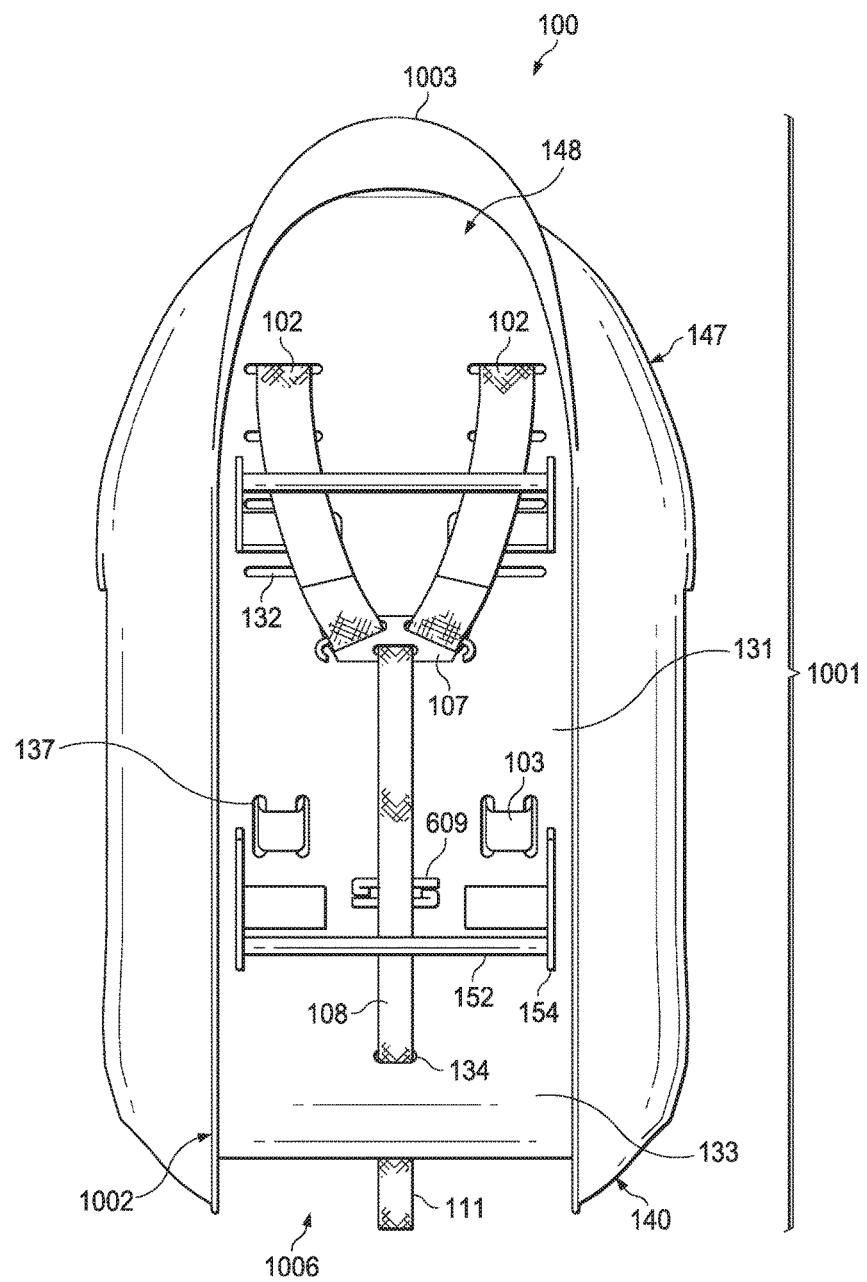
FIG. 10 is a bottom-up view of the child safety seat of FIG. 1.

Referring now to FIG. 10 is a bottom-up view of the child safety seat 100 of FIG. 1 is shown. The child safety seat 200 having the alternative quick release clamp 212 appears the same from this view point. The shell 147 defined by the chassis 140 can be seen to define a bottom opening 1001, which allows access to the back plate back 131 and back plate bottom 133 for adjustment of the harness system 110, which includes the shoulder straps 102, side straps 103, and quick release strap 108 having free end 111, among other components. Here the harness connector 107 can be seen to join the two shoulder straps 102 with the quick release strap 108 behind the back plate back 131 and/or the back plate bottom 133. The shoulder straps 102 may be sewn into loops where they join the harness connector 107 allowing them to be selectively detached from open ended slots defined in the harness connector. In other embodiments shoulder straps 102 are looped into sliding buckles (not shown) forming loops through slots (open or closed) in the harness connector 107. The quick release strap 108 may be similarly connected to the harness connector 107 although the quick release strap may also be looped and sewn onto a slot in the harness connector without the need to be selectively separable since the shoulder straps 102 are used to adjust the height of the harness 110 via selection of an individual pair of slots back plate strap slots 132 through which to pass the shoulder straps 102.

Figure 11:
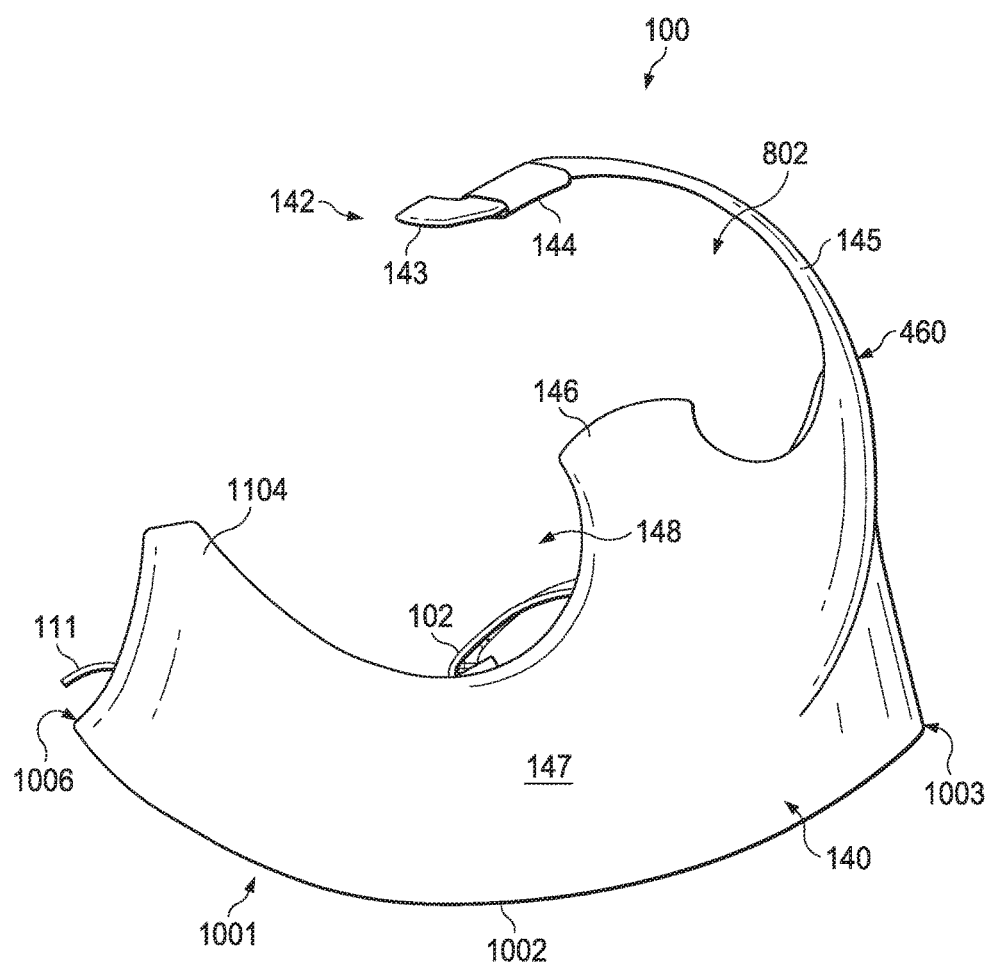
FIG. 11 is a side view of the child safety seat of FIG. 1.

Referring now also to FIG. 11, a side view of the child safety seat 100 of FIG. 1 is shown. The child safety seat 200 would appear substantially similar in this view. The child safety seat 100 and the child safety seat 200 share an identical chassis 140 in some embodiments. Accordingly, the chassis 140 of both devices provides a curved lower rail 1002. The rail 1002 forms the lower terminus of the chassis 141 and proceeds around the back of the chassis 141 and provides a rocking surface for both sides of the chassis 141. The rail 1002 is curved from front to back of the chassis 140 allowing the chassis 140 to rock, for example, to comfort an infant or small child. The rail 1002 may form a kick out 1003 such that the chassis 140 cannot rock too far rearwardly and tip over. The rail 1002 may extend frontwardly to a front opening 1006 to the protected interior 148. At the front of the chassis 140 the rail 1002 separates at the opening 1106 allowing additional room for a tall child's feet or legs.

The rail 1002 (as well as other edges defined by the chassis 141) may further include a silicone grip and/or rubber strip (not shown). Such grip or strip may serve to protect covered edges from damage as well as protect any surfaces against which the child safety seat would rest or rock. Yet further to this example, said silicone grip and/or rubber strip may lessen a potential sharp area so as to protect the user when carrying the associated child seat.

From the perspective of FIG. 11 it can also be seen how the shell 147 of the chassis 140 may extend both upwardly and frontwardly to define lower foot or leg guards 1104 (on both sides of the chassis 141). As shown below, this structure 1104 also provides increased vehicle installation options (e.g., lap belt only installation as shown in FIG. 20 below).

Figure 12:
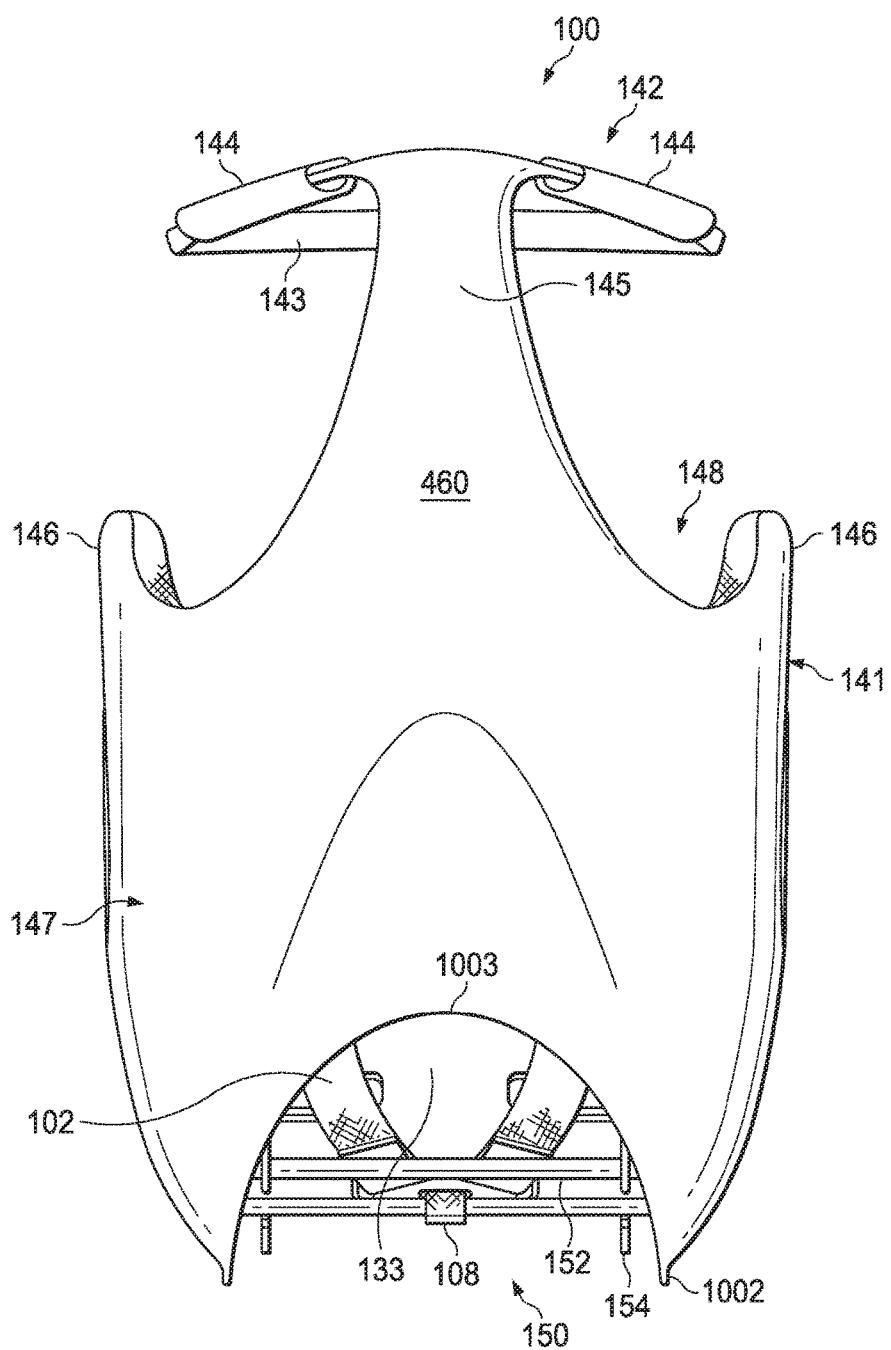
FIG. 12 is a back view of the child safety seat of FIG. 1.

Referring now to FIG. 12 is a back view of the child safety seat 100 of FIG. 1 is shown. The child safety seat 200 would appear substantially similar in this view. Here it can be seen that the chassis 141 provides substantially full protection against intrusion from the rear of the child safety seat 100. The handle assembly 141 can be seen to form a continuous surface with the rest of the chassis 141 and cantilever over the protected interior 148 from a single location or point of attachment 460.

Figure 13:
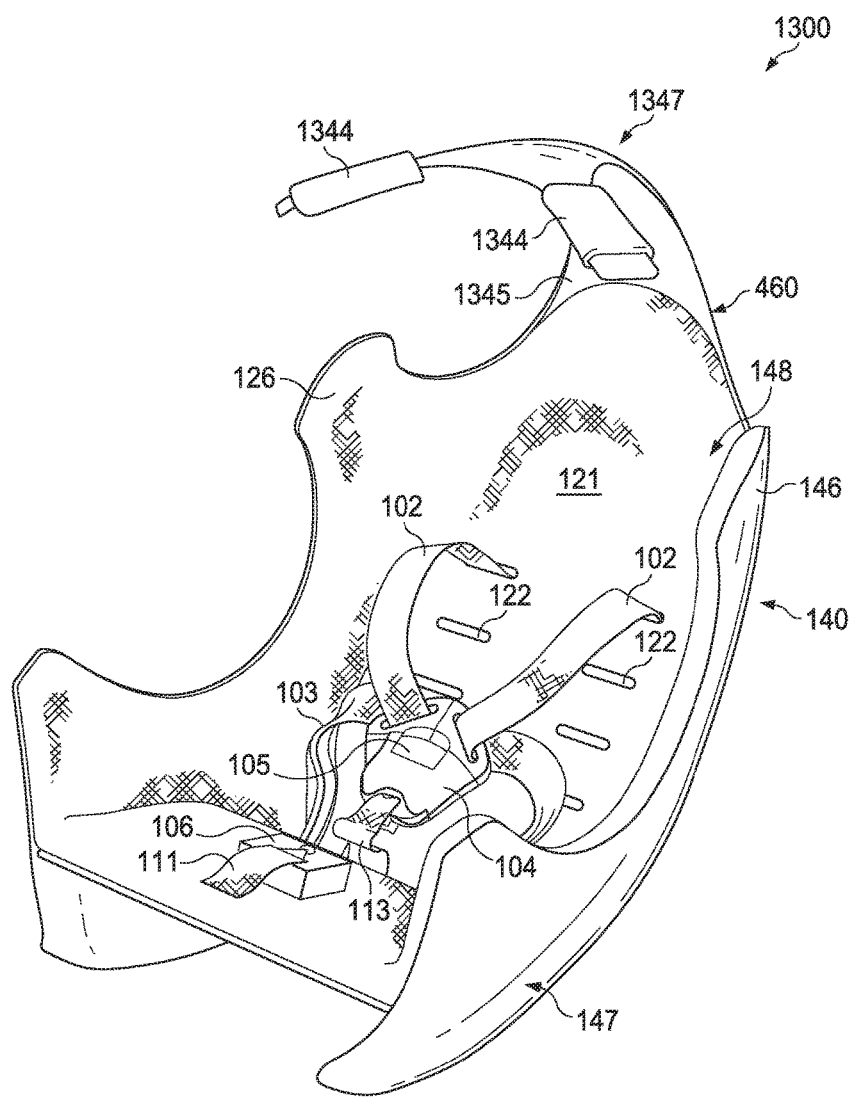
FIG. 13 is an isometric view of a child safety seat including an alternative handle according to aspects of the present disclosure.

Referring now to FIG. 13 is an isometric view of a child safety seat 1300 including an alternative chassis handle 1347 assembly according to aspects of the present disclosure is shown. The child safety seat 1300 is substantially similar to the seat 100 described above but for the substitution of the chassis handle 1347 for the handle assembly 142. Alternative chassis handle assembly 1347 may include chassis handle grip covers 1344 and chassis handle 1345. In some embodiments, chassis handle 1345 includes a proximal end and a distal end where the proximal end is configured to mechanically couple to the top edge of the chassis back (i.e., connection point 460), and the distal end is configured to allow a user to carry child safety seat 100. The proximal end of chassis handle 1345 (near connection point 460) may be wider than the distal end and exhibit an increased degree of curvature, thereby providing an increased structural stability and rigidity.

In yet other embodiments, chassis handle 1345 is implemented to protrude from one side of child safety seat 100. Further to these embodiments, chassis handle 1345 includes a proximal end and a distal end where the proximal end is configured to mechanically couple to the front edge of chassis 140 along the front edges of chassis side-impact supports 146 thereby protruding from the front/bottom of child safety seat 100.

In some embodiments, chassis handle grip covers 1344 and chassis handle 1345 together form chassis handle assembly 1347. In these embodiments, chassis handle assembly 1347 is configured as a single piece along the upper portion of chassis 140. In other embodiments, chassis handle assembly 1347 is configured as a separate assembly that is mechanically coupled to the upper portion of chassis 1340. In still other embodiments, chassis handle 1345 is configured along the upper portion of chassis 140 with the remaining elements of chassis handle assembly 1347 (i.e., chassis handle grip covers 1344) configured as a separate assembly for coupling to the upper portion of chassis handle 1345.

In some embodiments, chassis handle 1345 of chassis handle assembly 1347 is designed so as to allow a user to retract and/or rotate chassis handle assembly 1347 to various different positions. In an example, a user is able to conveniently retract and/or rotate chassis handle 1345 of chassis handle assembly 1347 when transporting or placing child safety seat 1300 into a vehicle such as a car, airplane, train, high-chair and/or stroller. Mechanisms that allow chassis handle 1345 of chassis handle assembly 1347 to retract/rotate include resistive-hinge mechanisms, telescoping mechanisms, mechanical slides/guides/bearings, malleable materials, or similar mechanisms (not shown) that would allow chassis handle 1345 to be locked into a desired fixed position. In other embodiments, chassis handle assembly 1347 can be manufactured separately and mechanically coupled to chassis 1340.

In some embodiments, chassis handle 1345 is designed to resist the impact associated with an adult/user falling onto said child seat containing a child. In other embodiments, chassis handle 1345 is designed to allow easy access to a child carried within child safety seat 1300 (e.g., placing the child in and out of said child seat). In another embodiment, chassis handle assembly 1347 is configured to allow a user to carry child safety seat 100. In still other embodiments, chassis handle assembly 1347 is configured to provide structural strength during transport and to absorb and/or diffuse energy associated with impacts, rollovers, drops, vehicle collisions, rotation against a vehicle seat, and the like. In other embodiments, chassis handle assembly 1347 can be constructed from any suitable materials, such as, for example carbon fiber, aramid fibers, ABS, steel, plastic, foam-core carbon fiber, fiber glass, aluminum, laminated wood, composites, combinations thereof, and the like. Further to these embodiments, chassis handle 1345 is configured as a handle that includes a structural support element (not shown), such as, for example a support rod, a support rod configured as a wishbone (e.g., contained within the chassis back (not visible), or coupled to chassis side supports 1346) for further providing support to chassis 140. In these embodiments, said structural support element can be integrated into chassis handle 1345 and/or chassis handle assembly 1347 during manufacturing.

In some embodiments, chassis handle grip covers 1344 are coupled to chassis handle 1345, and are configured to allow a user to grasp child safety seat 1300 with a desirable level of comfort. In these embodiments, handle grip covers 1344 are attached to chassis handle 1345 using any suitable method, such as for example stitching, sewing, gluing, riveting, snapping, buttoning, heat and/or combinations of the above. In other embodiments, handle grip covers 1344 are made from any suitable materials, such as, for example ABS plastic, PVC, wood, foam, leather, fabric, silicone, plastic enclosed gel and/or combinations of the above. In other embodiments, handle grip covers 1344 include a cushioning material (e.g., foam, leather, silicone, plastic enclosed gel, cotton, wood, fabrics, foam and combinations of the above) for the user's comfort.

Figure 14:
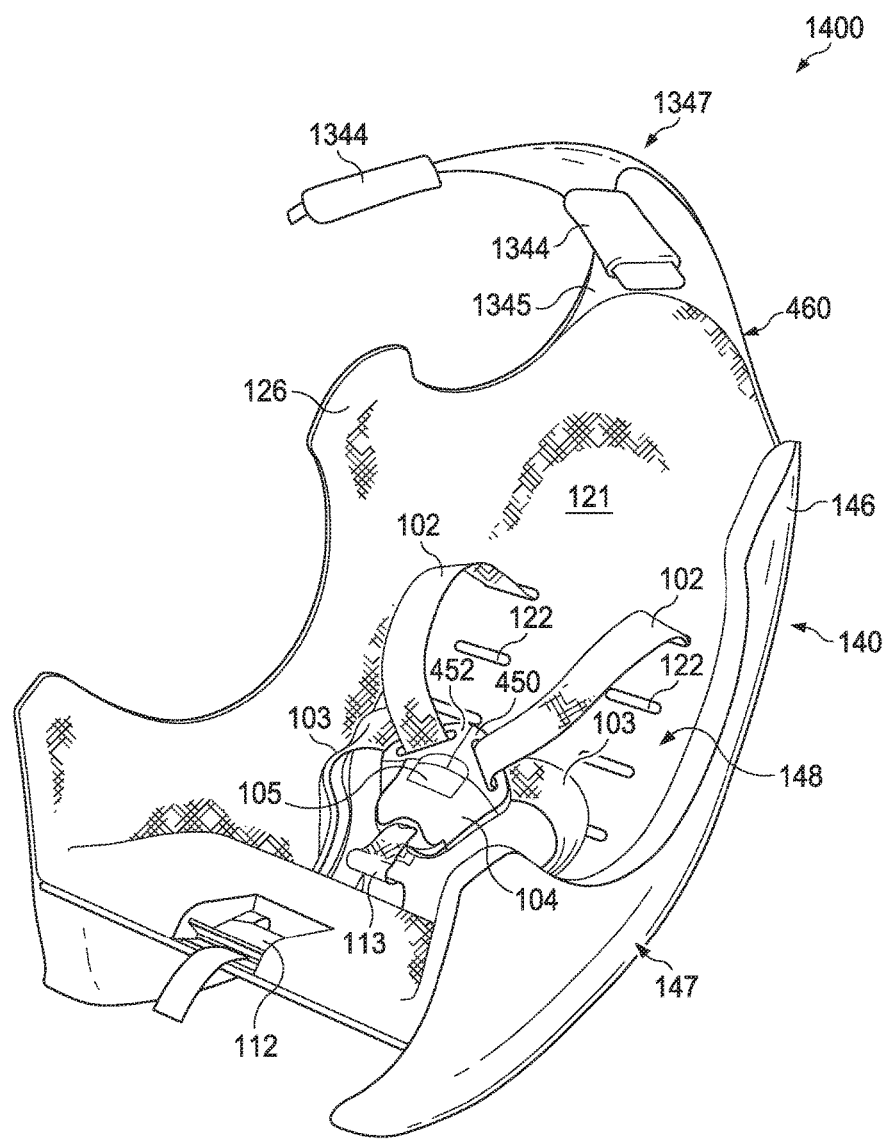
FIG. 14 is an isometric view of a child safety seat including an alternative handle and an alternative quick release clamp according to aspects of the present disclosure.

Referring now to FIG. 14 is an isometric view of a child safety 1400 seat including the alternative handle assembly 1347 is shown. The child safety seat 1400 is substantially similar to child safety seat 200 described above but with the substitution of the alternative handle assembly 1347, also described above, including all of the variations thereof described.

Figure 15:
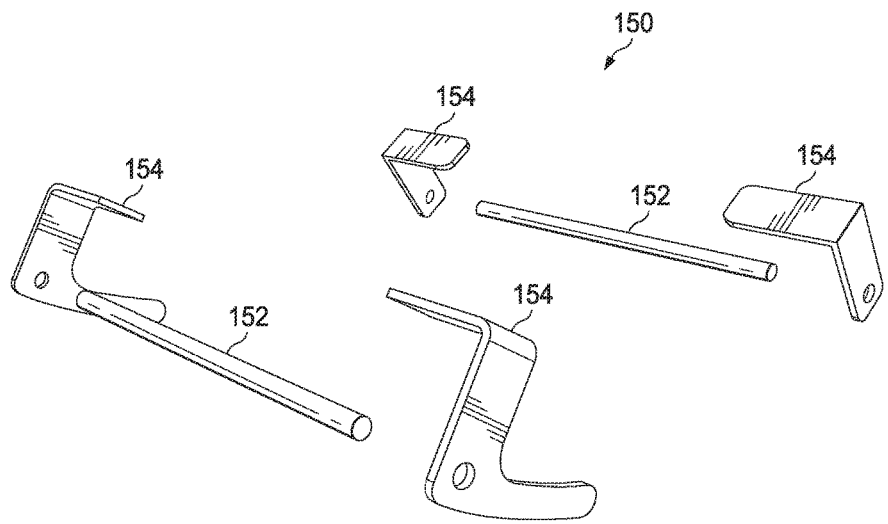
FIG. 15 is an isometric view of a mounting assembly for use with a child restraint seat according to aspects of the present disclosure.

Referring now to FIG. 15 is an isometric view of the mounting assembly 150 introduced above is shown. The mounting assembly 150 may include mounting rods 152 and secondary seat belt brackets 154.

Figure 16:
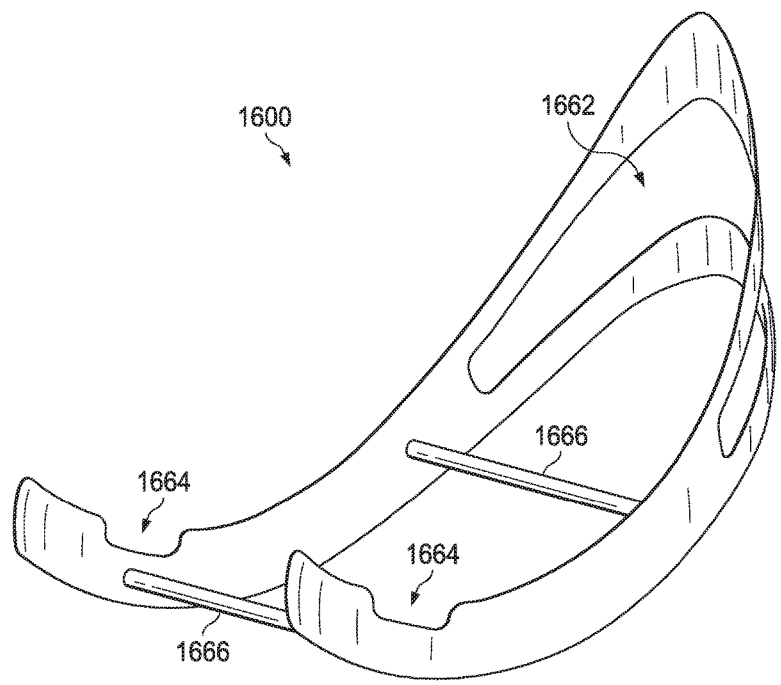
FIG. 16 is a perspective view of a lower railing for use with a child restraint seat according to aspects of the present disclosure.

Referring now to FIG. 16 is a perspective view of a railing for use in child seat according to aspects of the present disclosure is shown. The railing 1600 is suitable for use with any of the child safety seats discussed above including child safety seat 100, child safety seat 200, child safety seat 1300, and/or child safety seat 1400 and all variations and combinations thereof. Railing 1600 may include opening 1662, secondary seat belt passages 1664, and mounting rods 1666. In some embodiments, railing 1600 includes additional, fewer, or differently arranged components than those illustrated in FIG. 16.

In some embodiments, railing 1600 can be manufactured as a single piece. In other embodiments, railing 1600 can be manufactured separately from mounting rods 1666 and mechanically coupled together. In these embodiments railing 1600 is attached to chassis 140 via a suitable attachment mechanism such as for example an adhesive (e.g., epoxy, resin), screws, rivets, brackets, combinations thereof, and the like. Further to these embodiments, mounting rods 1666 can be attached to railing 1600 via any suitable attachment mechanism, such as, for example an adhesive (e.g., epoxy), screws, welding, brackets, or a combination thereof. In other embodiments, railing 1600 is implemented as built-in component within chassis 140.

The railing 1600 may replace the rail 1002 of previous embodiments insofar as providing a rocking mechanism for the respective child safety seat. The railing 1600 may also replace the mounting assembly 150 in the respective embodiments discussed above.

Railing 1600 may be implemented as a component that attaches to chassis 140. In these embodiments, railing 1600 is configured to the associated child safety seat to be installed in a mounting system in a vehicle (not shown) or elsewhere needed. Additionally, railing 1600 is configured to function as a rocking mechanism to allow a user to use child safety seat 100 as a rocking child chair. Mounting rods 1666 may be implemented to function substantially similar to rods in mounting assembly 150. Opening 1662 may be implemented as an opening in railing 1600 that allows easy access to one or more back plate strap slots 132 and/or harness system 110. The opening 1662 may decrease the amount of material necessary to manufacture railing 1600, thereby decreasing the weight of the respective child safety seat.

In some embodiments, secondary seat belt passages 1664 are implemented as geometric features that allow railing 1600 and the associated child safety to be installed in a vehicle or the like. In these embodiments, secondary seat belt passages 1664 allow a strap, belt, or other securing mechanism to secure the child seat in position. Further to these embodiments, access to said strap, belt, or other securing mechanism may be facilitated via opening 1662. Yet further to these embodiments, secondary seat belt passages 1664 and said strap, belt, or other securing mechanism are used to secure the child seat in vehicles lacking a specific mechanism to secure said child seat. In an example, opening 1662 may function as a secondary seat-belt pass-through for use when an ISOFIX/LATCH base adapter is unavailable; additionally, when said opening is used in conjunction with a vehicle's seat belt, opening 1662 allows the associated child seat to be secured within said vehicle.

Mounting rods 1666 may be implemented as cylinders attached to railing 1600 and used to secure the railing 1600 and associated child seat into a mounting base. In these embodiments, mounting rods 1666 are implemented so as to allow the associated child seat to be mounted onto a commercially available ISOFIX/LATCH base installed within a vehicle. Further to these embodiments, mounting rods 1666 may additionally allow the associated child seat to be mounted on a desired accessory, such as a mounting frame, rocking frame, stroller frame, and the like.

In some embodiments railing 1600 includes additional components, not shown, that provide a desired set of functionality. For example, railing 1600 may further include a silicone grip and/or rubber strip attached to the sections of said railing that will be in contact with the floor. In this example, said silicone grip and/or rubber strip may dampen the noise generated when rocking. Further to this example, said silicone grip and/or rubber strip may prevent scratches from forming on the floor, and the like. Yet further to this example, said silicone grip and/or rubber strip may lessen a potential sharp area so as to protect the user when carrying the associated child seat. In some embodiments, railing 1600 and mounting rods 1666 can be constructed from any suitable materials, such as, for example carbon fibers, aramid fibers, ABS plastic, foam-core composites, fiber glass, aluminum, laminated wood, composites, combinations thereof, and the like.

Figure 17:
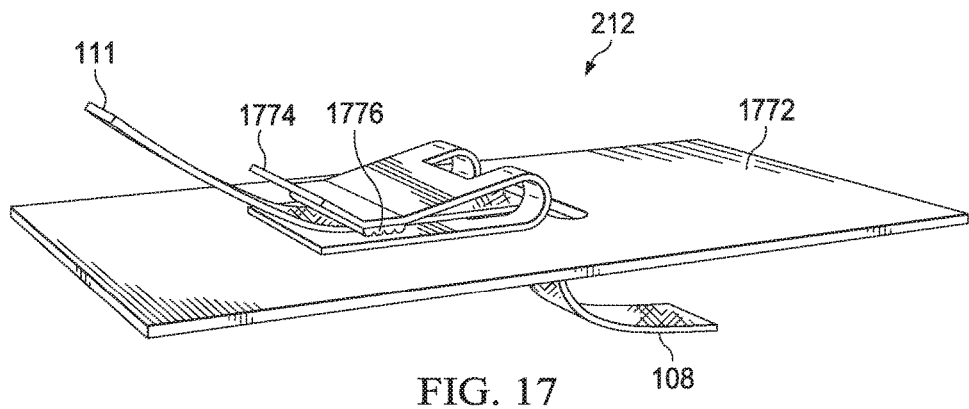
FIG. 17 is a perspective close up view of a quick release clamp for use with a child restraint seat according to aspects of the present disclosure.
Figure 18:
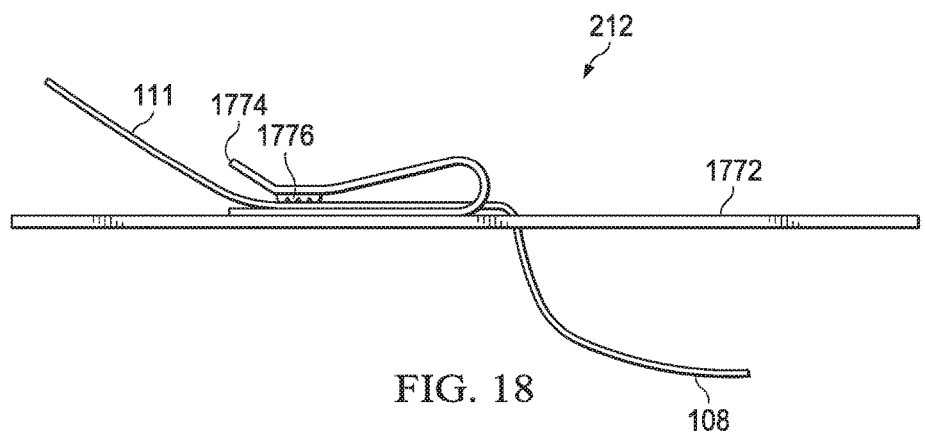
FIG. 18 is a side view of the quick release clamp of FIG. 17.

Referring now to FIG. 17, is a perspective view of the alternative quick release clamp 1200 introduced above is shown. Referring also to FIG. 18, a perspective side view of the alternative quick release clamp 212 is shown. The alternative quick release clamp 212 may comprise include safety lock mechanism 1770, back plate lock base 1772, strap release tab 1774, and locking teeth 1776. Quick release strap 108 and quick release strap free-end 111 (e.g., of harness system 110 of FIG. 2, above) are also shown. In some embodiments, quick release clamp 1200 includes additional, fewer, or differently arranged components than those illustrated in FIGS. 17-18.

In some embodiments, back plate lock base 1772 and strap release tab 1774 are manufactured separately and mechanically coupled together. In these embodiments, strap release tab 1774 is attached to back plate lock base 1772 via a suitable attachment mechanism such as for example an adhesive (e.g., epoxy, resin, etc.), screws, brackets, combinations thereof, and the like.

The safety lock mechanism 1770 may be implemented by a user by pulling strap release tab 1774. In these embodiments, pulling said tab that releases said safety measure is more difficult for an infant from a seated position, thereby providing more security in holding quick release strap 108 in position. Additionally, many current safety lock systems require the user to depress or push a button in order to release a clamp; depressing or pushing a button is easier to access for an infant, therefore more insecure. In other embodiments, strap release tab 1774 allows quick release strap 108 to be more easily implemented by a user, as compared to an infant in a seated position, for detaching/uncoupling. In case of an emergency, a child can be removed without the use of sharp cutting tools or larger equipment.

In some embodiments, quick release strap 108 is secured through strap release tab 1774 and locking teeth 1776. In these embodiments, safety lock mechanism 1770 secures said strap with no need of a receptacle to hold a pin or metal bar, as many current systems use. In other embodiments, the system of safety lock mechanism 1770 replaces bulky, aesthetically unpleasant, heavy housings. In these embodiments, because of the lack of a heavy, big, plastic housing, said safety lock mechanism can decrease costs of manufacture. In another embodiment, the simplicity of the design of safety lock mechanism 1770 removes space for crumbs, spills, waste and the like to accumulate in the lock itself, as current housing of safety locks leave room for said debris.

Back plate lock base 1772, strap release tab 1774, and locking teeth 1776 can be constructed from any suitable materials, such as, for example carbon fiber, steel, aluminum, fiber glass, laminated wood, composites, combinations thereof, and the like, at the contrary of current materials used such as for example plastic. In an example, said components of safety lock mechanism 1770 are made of carbon fiber; making said safety lock mechanism slim, smooth, elegant, light and easier to integrate into manufacturing process.

Referring now to FIG. 19, is a perspective environmental view 1900 illustrating installation of a child safety seat 100 according to aspects of the present disclosure with an ISOFIX base is shown. The environment 1900, as shown, is a simplified version of an automobile interior. A front seat 1902 and a back seat 1904 are shown in relation to a cab floor 1906. An ISOFIX or LATCH base 1910, may be provided as a component of the child safety seat 100, or may be a separate item obtained from a separate source. As is known in the art, the base 1910 may be securely mounted to the back seat 1904 via anchor points 1912. The base 1910 then provides the necessary hardware (not visible) for selective attachment to the child safety seat 100 (e.g., via mounting assembly 150 discussed above). Although only the specific use of child safety seat 100 is illustrated in FIG. 19, the other child safety seats described herein (e.g., 200, 1300, 1400 and their variations) may be deployed in the same manner.

Referring now to FIG. 20 is a perspective environmental view 2000 illustrating installation of a child safety 200 seat according to aspects of the present disclosure without an ISOFIX base. The environment 2000 is a simplified version of an automobile interior including front seat 1902 and back seat 1904 affixed to the cab floor 1906. In the environment 2000, no ISOFIX base is utilized (due to lack of anchor points, lack of a base, or both). As is known in the art, the back seat 1904 is provided with a safety belt 2002 that may include a shoulder strap 2004 and a lap belt 2006. The lap belt 2006 may be placed somewhat centrally over the chassis 140 of the child safety seat 200 as shown such that the lap belt passes over the chassis proximally to the lower guards 1104. Thus the combination of the shape of the chassis 140 and the ability of the lap belt 2006 to provide a strong mechanical connection provides for proper anchoring of the safety seat 200 without an ISOFIX base. Although only the specific use of child safety seat 200 is illustrated in FIG. 20, the other child safety seats described herein (e.g., 100, 1300, 1400 and their variations) may be deployed in the same manner.

Installation in any of the scenarios herein presumes that the user is familiar with the proper methodology of using either seat belts or ISOFIX/LATCH bases to secure a child safety seat into a car. As such, the methodologies are not provided in detail and any user of a child safety seat should seek professional guidance if he or she is unclear on proper and safe usage of any vehicle equipment.

Referring now to FIG. 21, a perspective illustration of a child safety seat 200 according to aspects of the present disclosure with a simulated infant 2102 secured therein is shown. In one example, each of the safety belt straps 102, side straps 103, and center strap 113 wrap around/between one or more appendages and/or the torso of a child with the left sliding buckle 450, the right sliding buckle 452, and the bottom buckle 454 joining to complete the center connector mechanism 104 of the harness system 110 thereby causing the restriction of free movement of the child 2102 and securing the child 2102 within child safety seat 200. Although as shown, the center connector mechanism 104 operated by the sliding buckles 450, 452 inserting into the lower buckle 454, other types of center connector mechanisms 104 could be used.

In some embodiments, safety belt straps 102, side straps 103, and center strap 113 are fastened in front of the child so that the child's shoulders and body fit firmly within the child seat, with the five-point safety harness 104 and the associated portions of safety belt straps 102 far enough from the throat to prevent a chance of choking. In other embodiments, safety belt straps 102 associated with harness system 110 can include a length adjustment mechanism, allowing harness system 110 to be adapted to children of different ages and/or sizes.

Although only the specific use of child safety seat 200 is illustrated in FIG. 21, the other child safety seats described herein (e.g., 100, 1300, 1400 and their variations) may be deployed in the same manner.

While various aspects and embodiments have been disclosed, other aspects and embodiments are contemplated. The various aspects and embodiments disclosed herein are for purposes of illustration and are not intended to be limiting, with the true scope and spirit being indicated by the following claims.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A car seat comprising:
   an outer chassis defining left, right, front, and back portions, a protected interior space, and a top opening from a one piece shell;
   an integral, non-adjustable handle formed as a component of the one piece shell proceeding upwardly and forwardly from the back portion of the outer chassis to cover the top opening while leaving access to place a child into, and remove a child from, the protected interior space;
   a back plate rigidly affixed to the outer chassis in the protected interior space and providing a seat back oriented toward the back portion of the chassis and a seat bottom oriented toward the front portion of the chassis;
   a five-point safety harness including a pair of shoulder straps continuous with a pair of side straps, each single shoulder and side strap joined with a portion of a three way connector, the pair of shoulder straps passing from a front to a back of the seat back and the pair of side straps passing from above to below the seat bottom where pair of the shoulder straps join together, the five-point safety harness also including a center strap joined with a portion of the three way connector and passing from above to below the seat bottom where the center strap is retained by a rigid clamp; and
   a carbon fiber spring clip adjustment mechanism fixed with respect to the car seat and selectively engaged and adjustable with an adjustment strap passing under the seat bottom to join the pair of shoulder straps;
   wherein the seat back defines a plurality of pairs of openings at different heights to allow the pair of shoulder straps to be adjusted for children of different sizes.

2. The car seat of claim 1, wherein the chassis further defines convex left and right outermost surfaces, upper and lower pairs of side impact supports, and a curved bottom surface allowing the car seat to rock on a flat surface.

3. A car seat comprising:
   a chassis formed as a continuous, one piece shell and defining a protected interior with space for a child, a top opening to the protected interior, and side impact supports on opposite left and right sides of the top opening;
   a rigid handle that is integral with the chassis and proceeds over the top opening from a back of the protected interior covering a portion of the top opening as a carry handle and as a roll bar against impacts or intrusions into the protected interior; and
   a back plate rigidly fixed to the chassis in the protected interior and providing a seat back and seat bottom oriented toward the back and front, respectively, of the protected interior;
   wherein:
      the back plate defines a plurality of openings for affixing a five-point child safety harness;
      the seat back defines a plurality of opening pairs defined at different elevations allowing adjustment of the five-point child safety harness for varying child sizes;
      a pair of shoulder straps join an adjustment strap behind the seat back;
      the adjustment strap passes under and through the seat bottom to be accessible from a front upper portion of the seat bottom;
      the pair of shoulder straps and a pair of side straps form continuous pieces;
      a functional delineation between the pair of side straps and the pair of shoulder straps is defined at a sliding buckle that selectively attaches to a three way center connector;
      the pair of side straps pass through openings defined in the seat bottom and join together under the seat bottom; and
      a center strap selectively joins the three way center connector and passes through an opening defined in the seat bottom and is retained by a rigid clamp below the seat bottom.

4. The car seat of claim 3, wherein the adjustment strap is selectively retained by a toothed spring clip opening away from the seat back.

5. The car seat of claim 3, wherein the chassis defines a curved lower surface allowing the car seat to rock on level ground.

6. The car seat of claim 3, wherein the rigid handle defines a loop over the top opening providing a plurality of carry handle surfaces.

7. The car seat of claim 3, wherein the rigid handle is concave on a lower surface to provide a stable carry no-hands carry position on the arm of a person carrying the car seat.

8. The car seat of claim 3, wherein the chassis defines left and right convex outer curves projecting beyond any other surface or edge of the car seat.

* * * * *